US012072478B2

(12) United States Patent
Suzuki

(10) Patent No.: US 12,072,478 B2
(45) Date of Patent: *Aug. 27, 2024

(54) OPTICAL SYSTEM AND IMAGING APPARATUS INCLUDING THE SAME

(71) Applicant: CANON KABUSHIKI KAISHA, Tokyo (JP)

(72) Inventor: Takumi Suzuki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,846

(22) Filed: Aug. 18, 2022

(65) Prior Publication Data
US 2022/0404596 A1 Dec. 22, 2022

Related U.S. Application Data

(63) Continuation of application No. 16/592,391, filed on Oct. 3, 2019, now Pat. No. 11,467,385.

(30) Foreign Application Priority Data

Oct. 15, 2018 (JP) .................................. 2018-194671

(51) Int. Cl.
G02B 15/14 (2006.01)
G02B 15/22 (2006.01)

(52) U.S. Cl.
CPC .............. G02B 15/145105 (2019.08); G02B 15/145103 (2019.08); G02B 15/145113 (2019.08);
(Continued)

(58) Field of Classification Search
CPC .... G02B 15/145105; G02B 15/145103; G02B 15/145113; G02B 15/145121;
(Continued)

(56) References Cited

U.S. PATENT DOCUMENTS 11,372,206 B2 * 6/2022 Mori ............... G02B 15/145105
11,467,385 B2 * 10/2022 Suzuki ........... G02B 15/145121
(Continued)

FOREIGN PATENT DOCUMENTS

CN 104 199 179 A 12/2014
JP 2001 033704 A 2/2001
(Continued)

*Primary Examiner* — George G. King
(74) *Attorney, Agent, or Firm* — CANON U.S.A., INC. IP Division

(57) ABSTRACT

In an optical system according to each exemplary embodiment, an interval between adjacent lens units changes in focusing from an infinite-distance object to a close-distance object, and a first in-focus state in which $\beta=-1.2$ is obtained can be caused, where $\beta$ is a lateral magnification of an entire system. The optical system according to each exemplary embodiment includes a plurality of focus lens units, and out of a focus lens unit having a largest absolute value of a focus sensitivity and a focus lens unit having a second largest absolute value of a focus sensitivity in a state in which focus is put on an infinite-distance object, a focus lens unit disposed on an object side is a lens unit LA, and a focus lens unit disposed on an image side is a lens unit LB. A partial optical system LC including all lenses disposed on the image side of the lens unit LB has negative refractive power. The partial optical system LC satisfies a predetermined conditional expression.

18 Claims, 17 Drawing Sheets

(52) U.S. Cl.
CPC ............... *G02B 15/145121* (2019.08); *G02B 15/145511* (2019.08); *G02B 15/1461* (2019.08); *G02B 15/22* (2013.01)

(58) Field of Classification Search
CPC ........ G02B 15/145511; G02B 15/1461; G02B 15/22; G02B 13/02; G02B 7/04; G02B 15/1455; G02B 15/1451; G02B 15/177; G03B 13/34
See application file for complete search history.

(56) References Cited

U.S. PATENT DOCUMENTS

| | | |
|---|---|---|
| 2004/0017605 A1 | 1/2004 | Kasahara |
| 2007/0258150 A1* | 11/2007 | Takato ................. G02B 13/006 359/686 |
| 2012/0081798 A1 | 4/2012 | Ryu |
| 2013/0188091 A1* | 7/2013 | Hara .............. G02B 15/145105 359/693 |
| 2014/0334014 A1 | 11/2014 | Matsui |
| 2018/0246292 A1 | 8/2018 | Tomioka |
| 2020/0174225 A1* | 6/2020 | Mori ...................... G02B 13/02 |

FOREIGN PATENT DOCUMENTS

| | | |
|---|---|---|
| JP | 2012 058682 A | 3/2012 |
| JP | 2012 220828 A | 11/2012 |
| JP | 2015 215494 A | 12/2015 |

\* cited by examiner

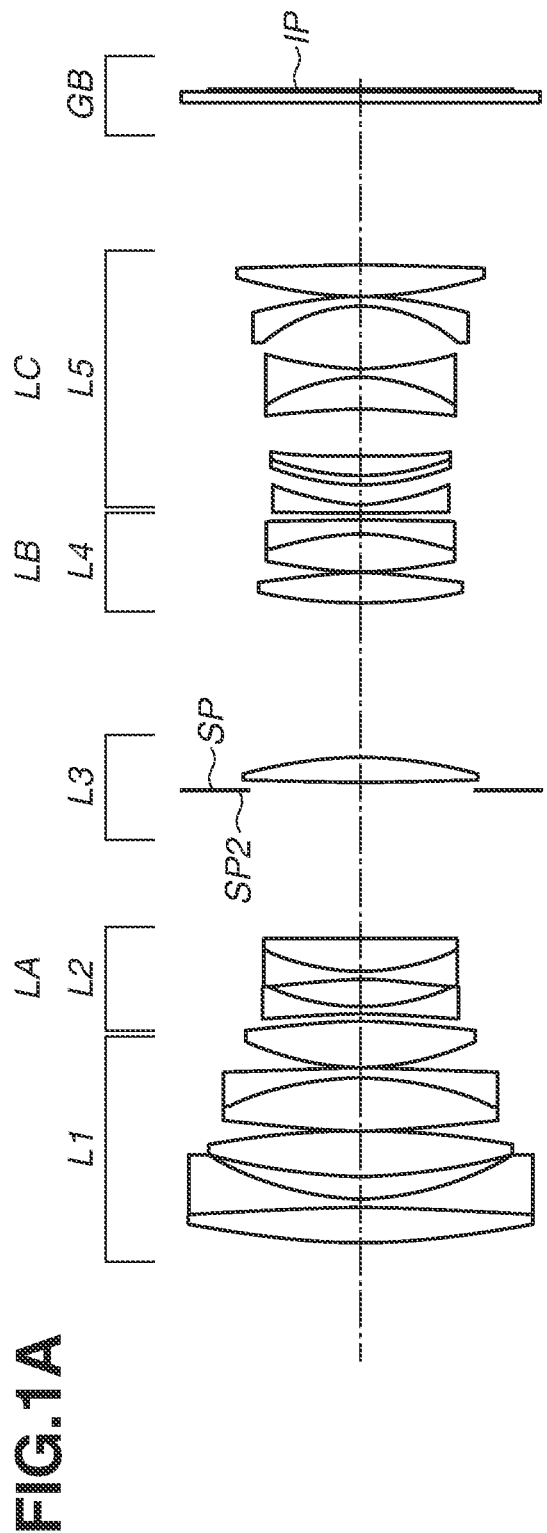
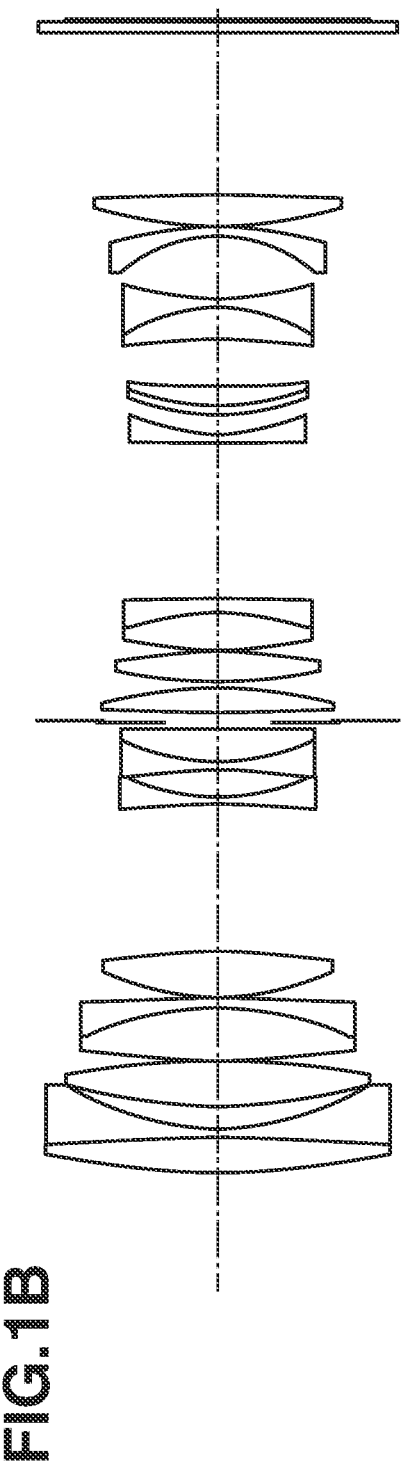

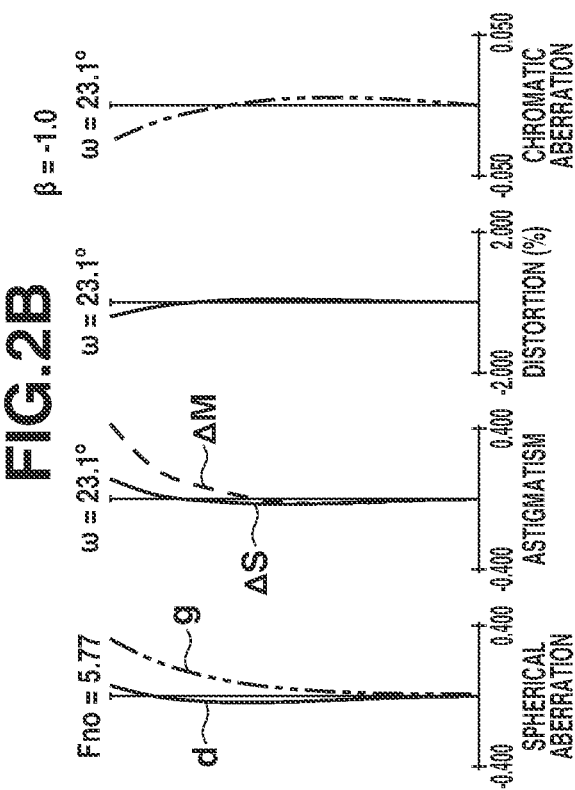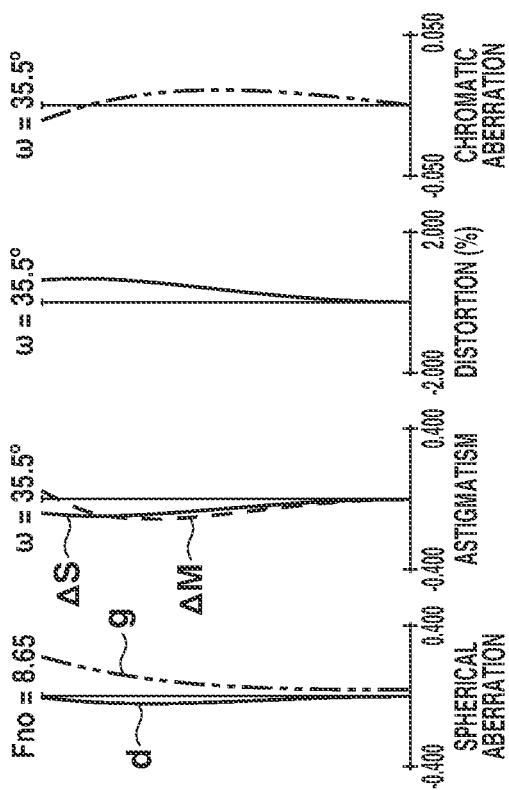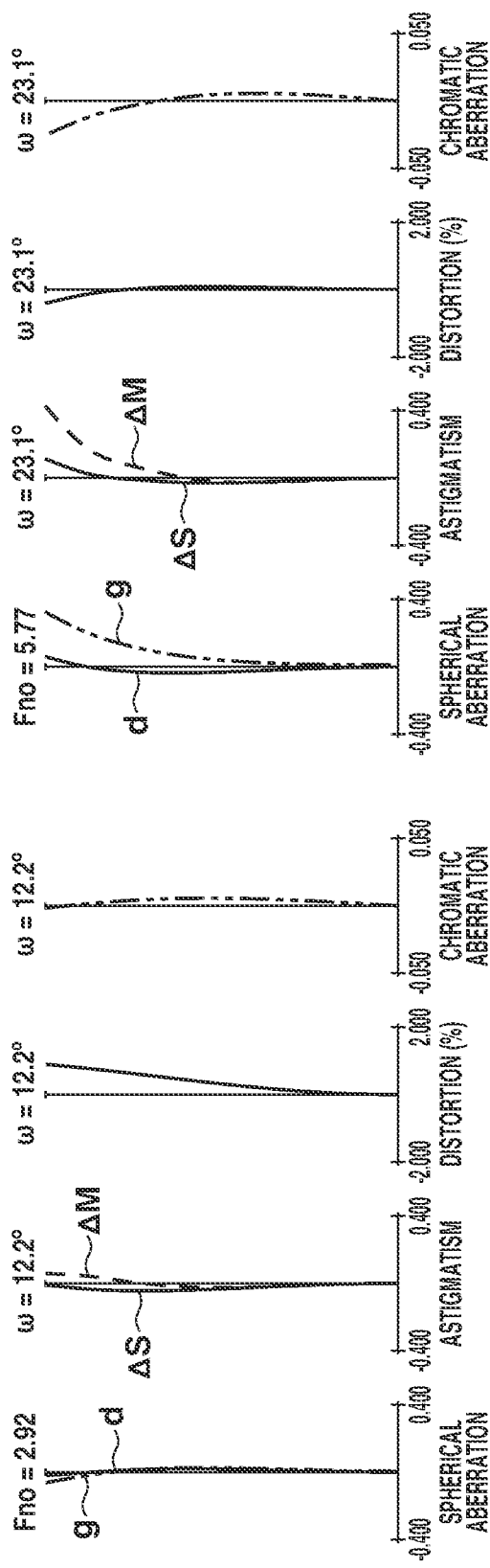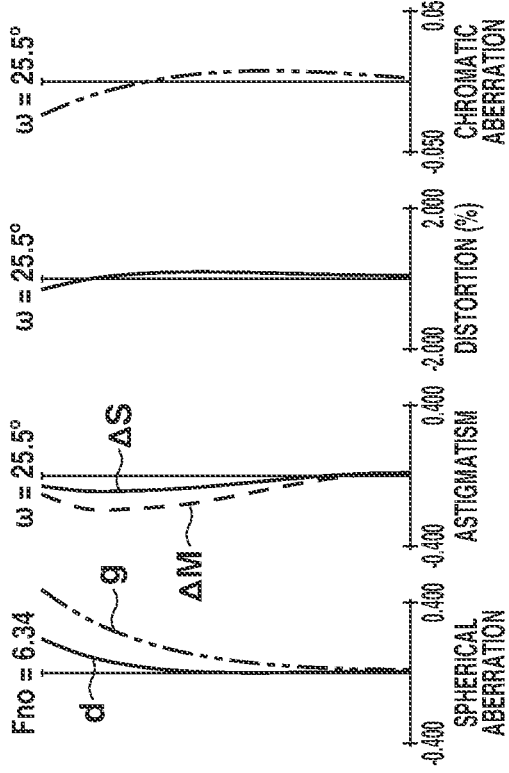

β = -2.0

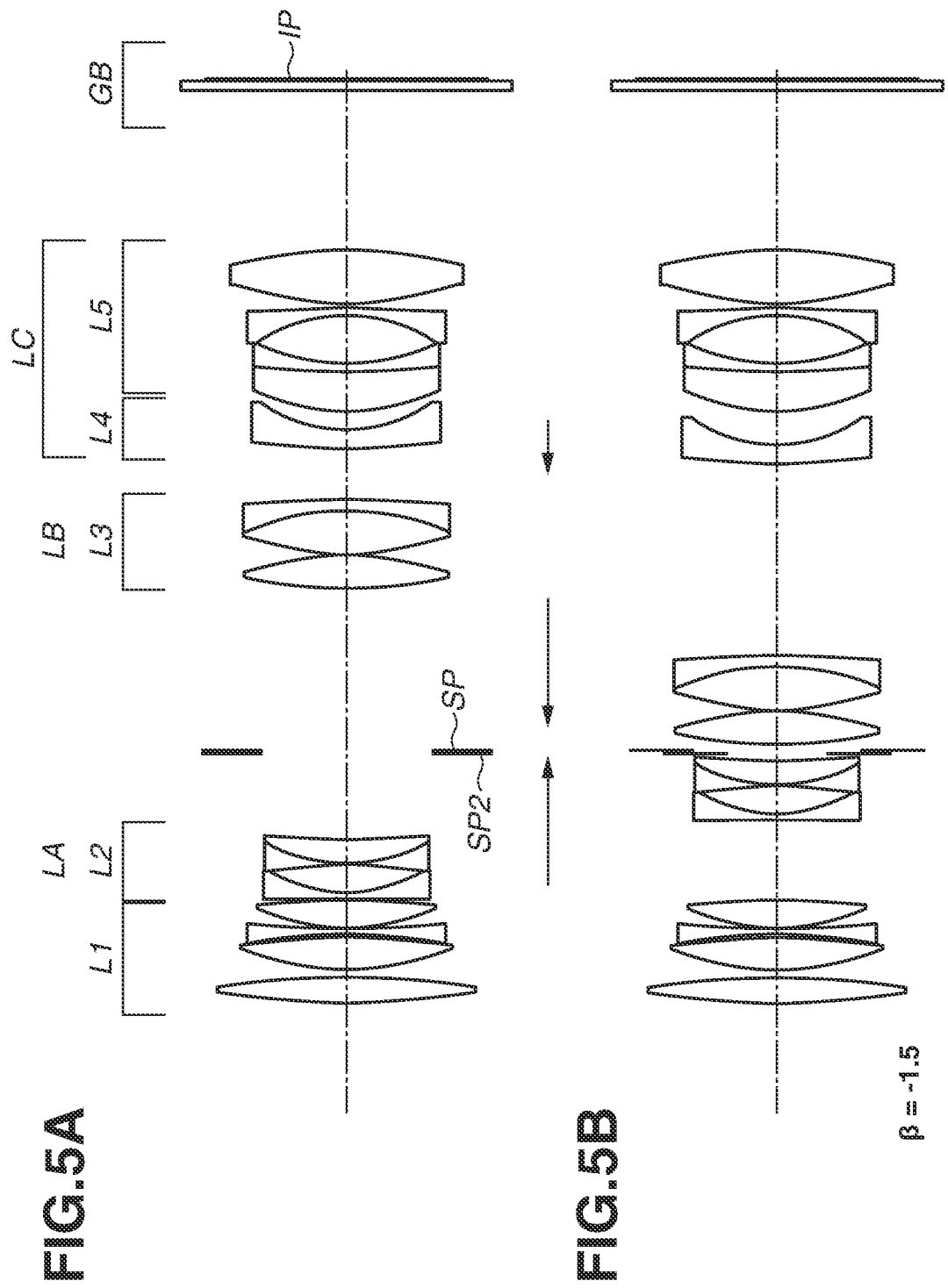

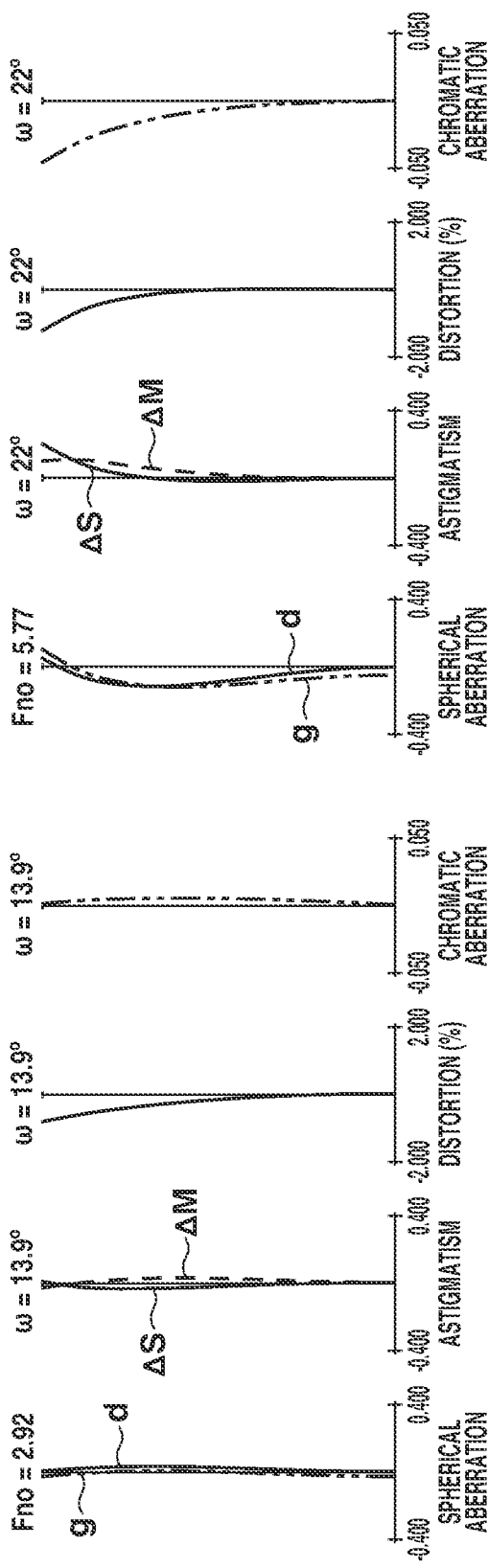

FIG. 7B  β = −2.8

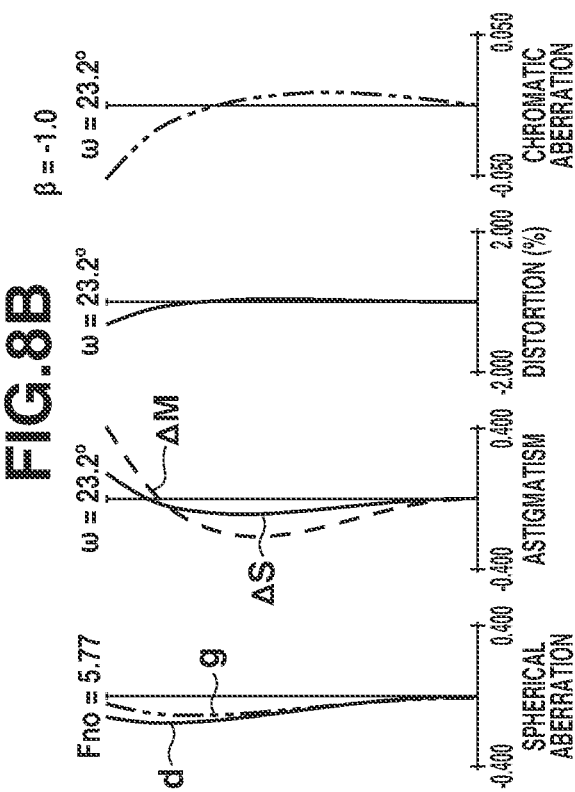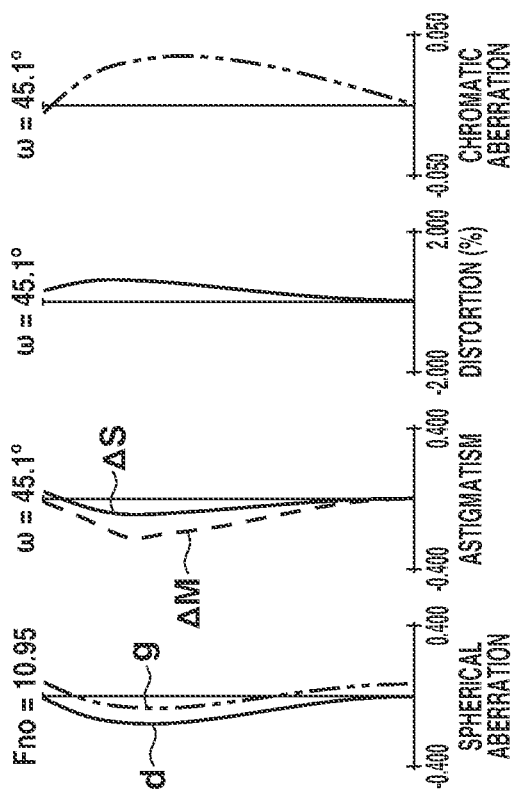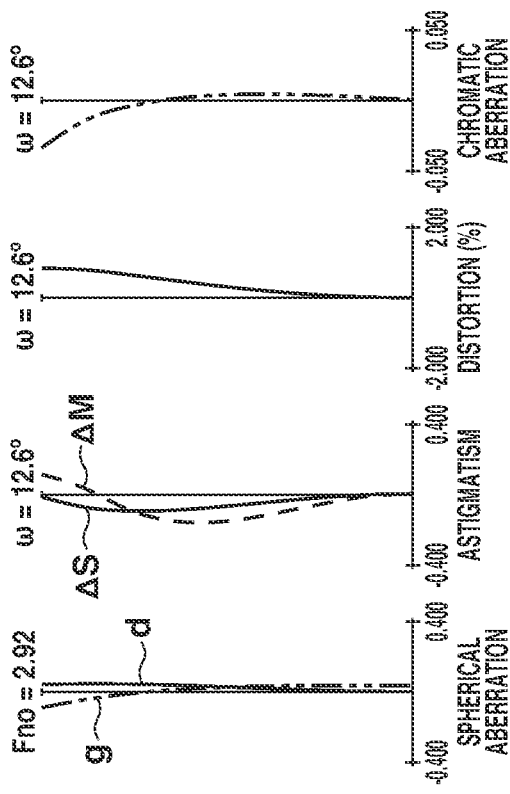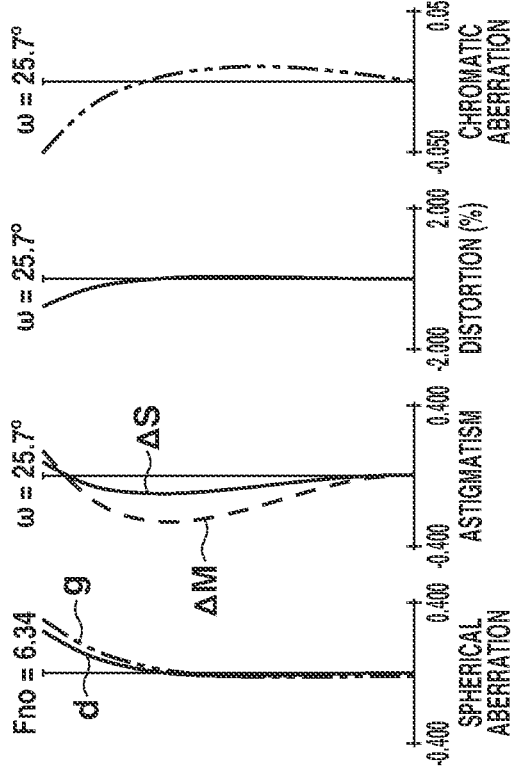

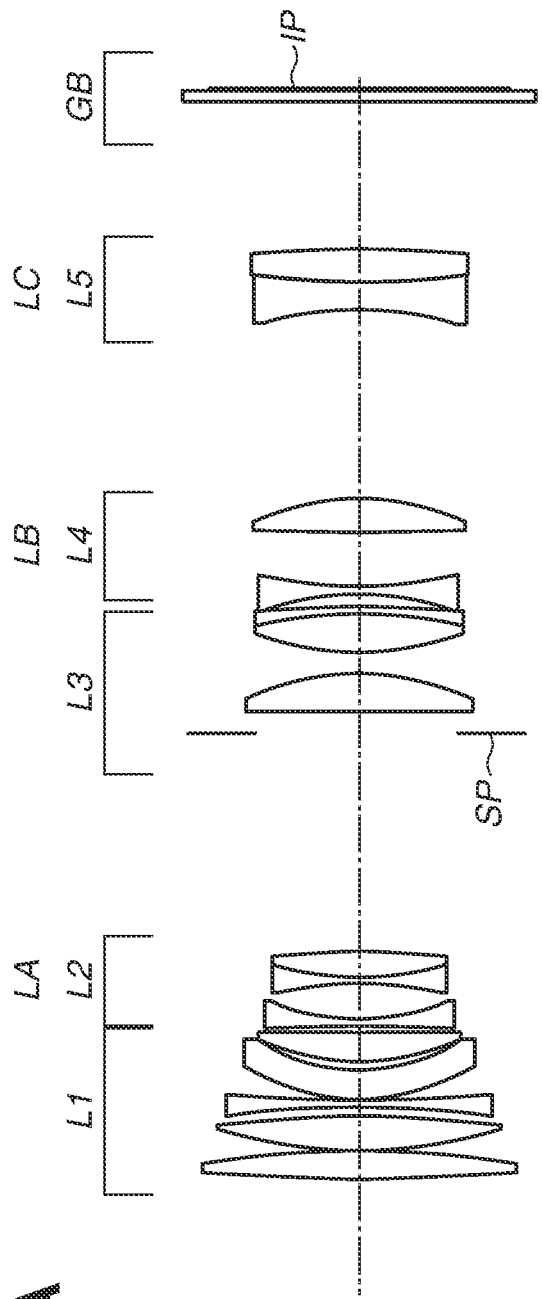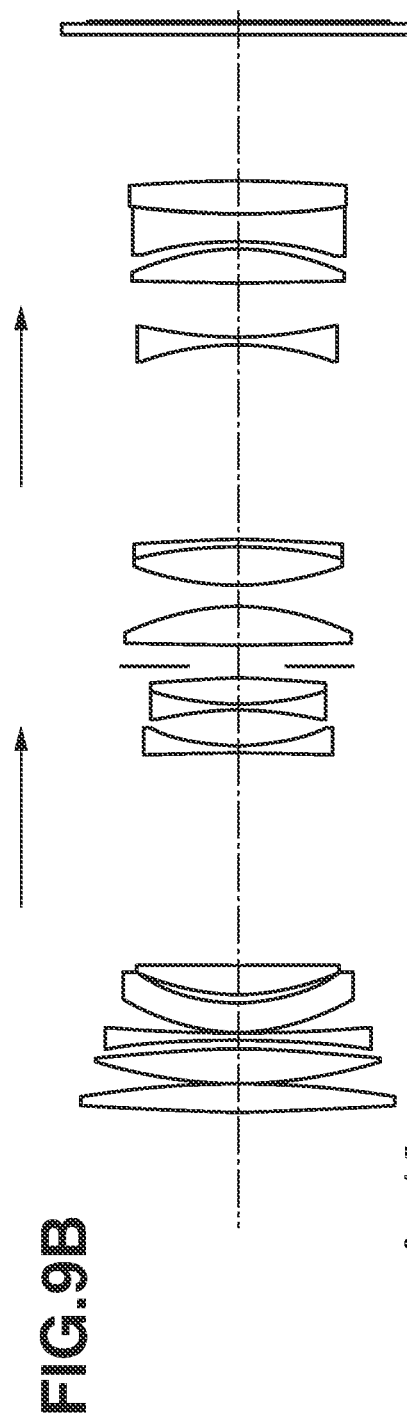

β = -2.0

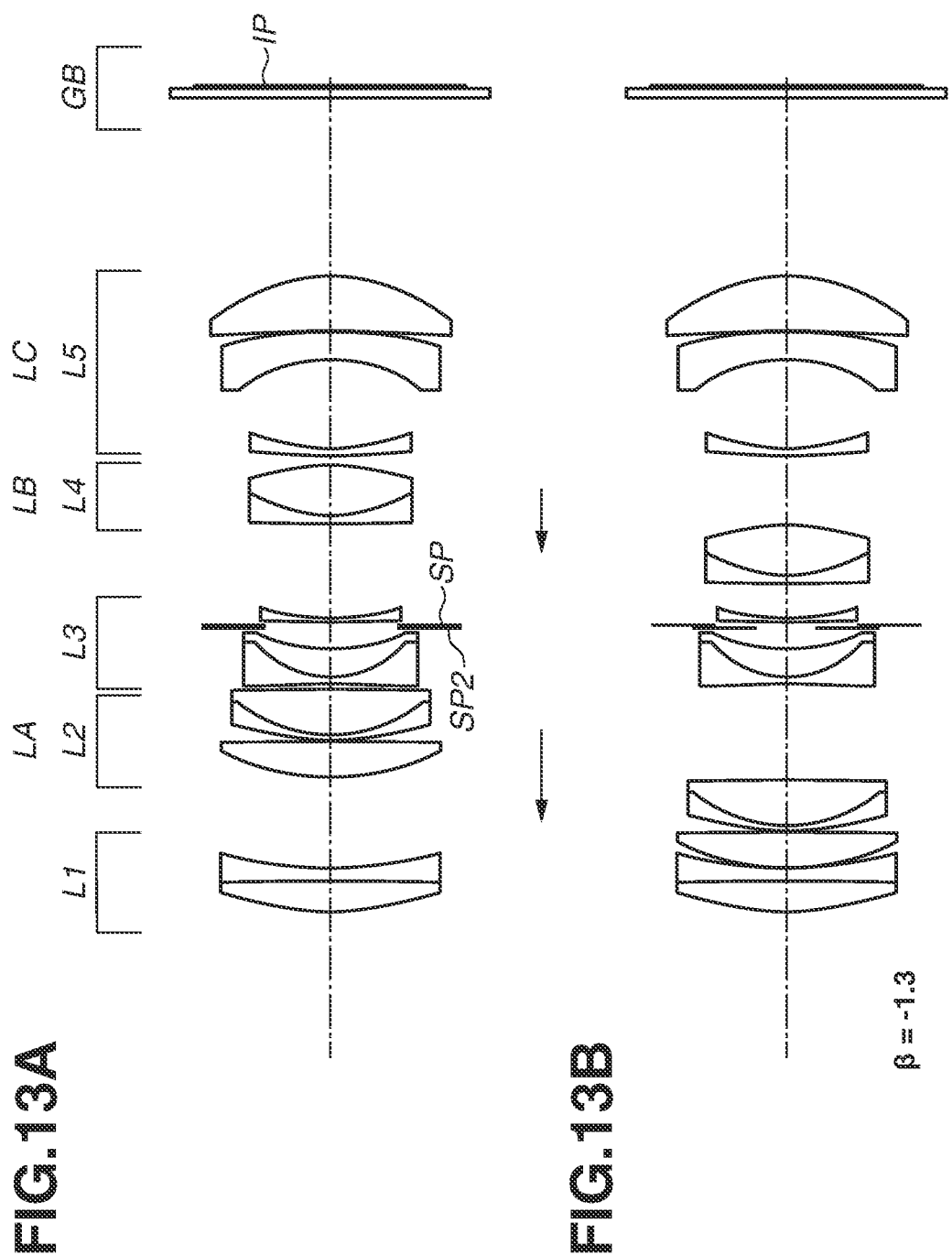

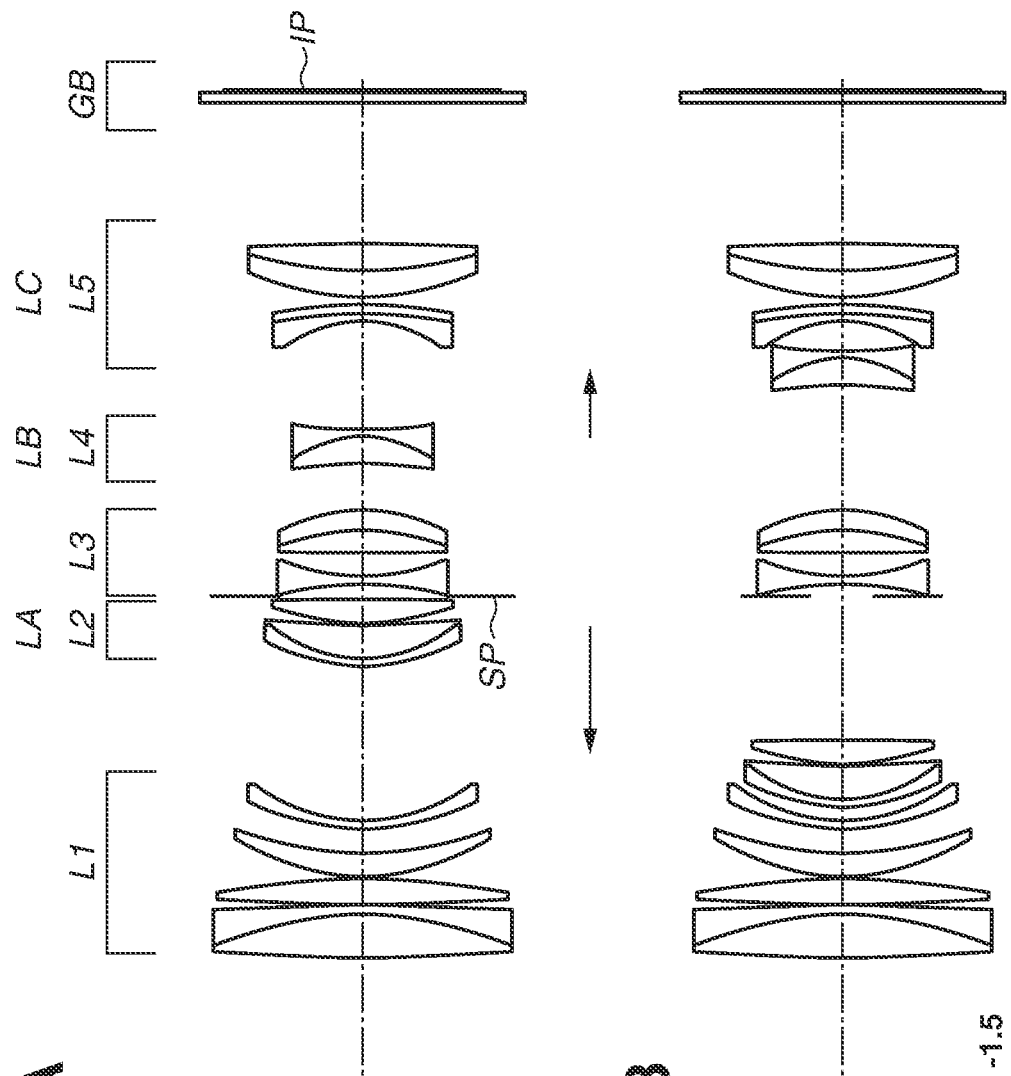

OPTICAL SYSTEM AND IMAGING APPARATUS INCLUDING THE SAME

CROSS-REFERENCE TO RELATED APPLICATION

This application is a Continuation of U.S. Application Ser. No. 16/592,391, filed Oct. 3, 2019, which claims priority from Japanese Patent Application No. 2018-194671, filed Oct. 15, 2018, which are hereby incorporated by reference herein in their entireties.

BACKGROUND OF THE INVENTION

Field of the Invention

The present invention relates to an optical system, which is suitable for digital video cameras, digital still cameras, broadcasting cameras, silver-halide film cameras, monitoring cameras, and the like.

Description of the Related Art

A macro lens is known as a lens that can perform close-up image capturing. In recent years, there has been demand for a macro lens that can capture an image of an infinite-distance object, and can also perform close-up image capturing at an imaging magnification increased to the same magnification or more.

Japanese Patent Application Laid-Open No. 2015-034899 discusses an optical system (a macro lens) that can perform enlarged image capturing, enlarged from an infinite-distance object to about a 2× imaging magnification.

By positioning a lens unit with positive refractive power at the closest position to an image plane (IP) on an image side, the optical system discussed in Japanese Patent Application Laid-Open No. 2015-034899 shortens the moving distance of a focus lens unit, during focusing, and suppresses a decline in optical performance for enlarged image capturing. However, a lens diameter may be increased as imaging magnification increases.

SUMMARY OF THE INVENTION

The present invention is directed to a compact optical system that has high optical performance and can perform image capturing at an imaging magnification of a same magnification or more, and an imaging apparatus including the optical system.

According to an aspect of the present invention, An optical system in which an interval between adjacent lens units is configured to change during focusing from an infinite-distance object to a close-distance object, and in which in a first in-focus position $\beta=-1.2$ is satisfied, where $\beta$ is a lateral magnification of the optical system, includes a plurality of focus lens units configured to move during focusing from an infinite-distance object to a close-distance object, wherein, out of a focus lens unit having a largest absolute value of a focus sensitivity and a focus lens unit having a second largest absolute value of a focus sensitivity among the plurality of focus lens units in an in-focus state on an infinite-distance object, a focus lens unit disposed on an object side is a first focus lens unit (LA), and a focus lens unit disposed on an image side is a second focus lens unit (LB), wherein a partial optical system (LC) including all lenses disposed on the image side of the second focus lens unit (LB) has negative refractive power, and wherein the following conditional expression is satisfied:

$$-3.00 < fLCX/fX < -0.50,$$

where fLCX is a focal length of the partial optical system (LC) in the first in-focus state, and fX is a focal length of the optical system in the first in-focus state.

According to another aspect of the present invention, an imaging apparatus includes an optical system, and an image sensor configured to photoelectrically convert an optical image formed by the optical system, wherein, in the optical system, an interval between adjacent lens units changes in focusing from an infinite-distance object to a close-distance object, and a first in-focus state in which $\beta=-1.2$ is satisfied can be achieved, where $\beta$ is a lateral magnification of an entire system, wherein the optical system includes a plurality of focus lens units configured to move in focusing from an infinite-distance object to a close-distance object, wherein, out of a focus lens unit having a largest absolute value of a focus sensitivity and a focus lens unit having a second largest absolute value of a focus sensitivity among the plurality of focus lens units in an in-focus state on an infinite-distance object, a focus lens unit disposed on an object side is a lens unit LA, and a focus lens unit disposed on an image side is a lens unit LB, wherein a partial optical system LC including all lenses disposed on the image side of the lens unit LB has negative refractive power, and wherein the following conditional expression is satisfied:

$$-3.00 < fLCX/fX < -0.50,$$

where fLCX is a focal length of the partial optical system LC in the first in-focus state, and fX is a focal length of the optical system in the first in-focus state.

Further features of the present invention will become apparent from the following description of exemplary embodiments with reference to the attached drawings.

BRIEF DESCRIPTION OF THE DRAWINGS

FIGS. 1A and 1B are cross-sectional diagrams of an optical system according to a first exemplary embodiment.

FIGS. 2A, 2B, 2C, and 2D are aberration diagrams of the optical system according to the first exemplary embodiment.

FIGS. 5A and 5B are cross-sectional diagrams of an optical system according to a third exemplary embodiment.

FIGS. 6A, 6B, 6C, and 6D are aberration diagrams of the optical system according to the third exemplary embodiment.

FIGS. 7A and 7B are cross-sectional diagrams of an optical system according to a fourth exemplary embodiment.

FIGS. 8A, 8B, 8C, and 8D are aberration diagrams of the optical system according to the fourth exemplary embodiment.

FIGS. 9A and 9B are cross-sectional diagrams of an optical system according to a fifth exemplary embodiment.

FIGS. 13A and 13B are cross-sectional diagrams of an optical system according to a seventh exemplary embodiment.

FIGS. 15A and 15B are cross-sectional diagrams of an optical system according to an eighth exemplary embodiment.

DESCRIPTION OF THE EMBODIMENTS

Figures 3A, 3B:
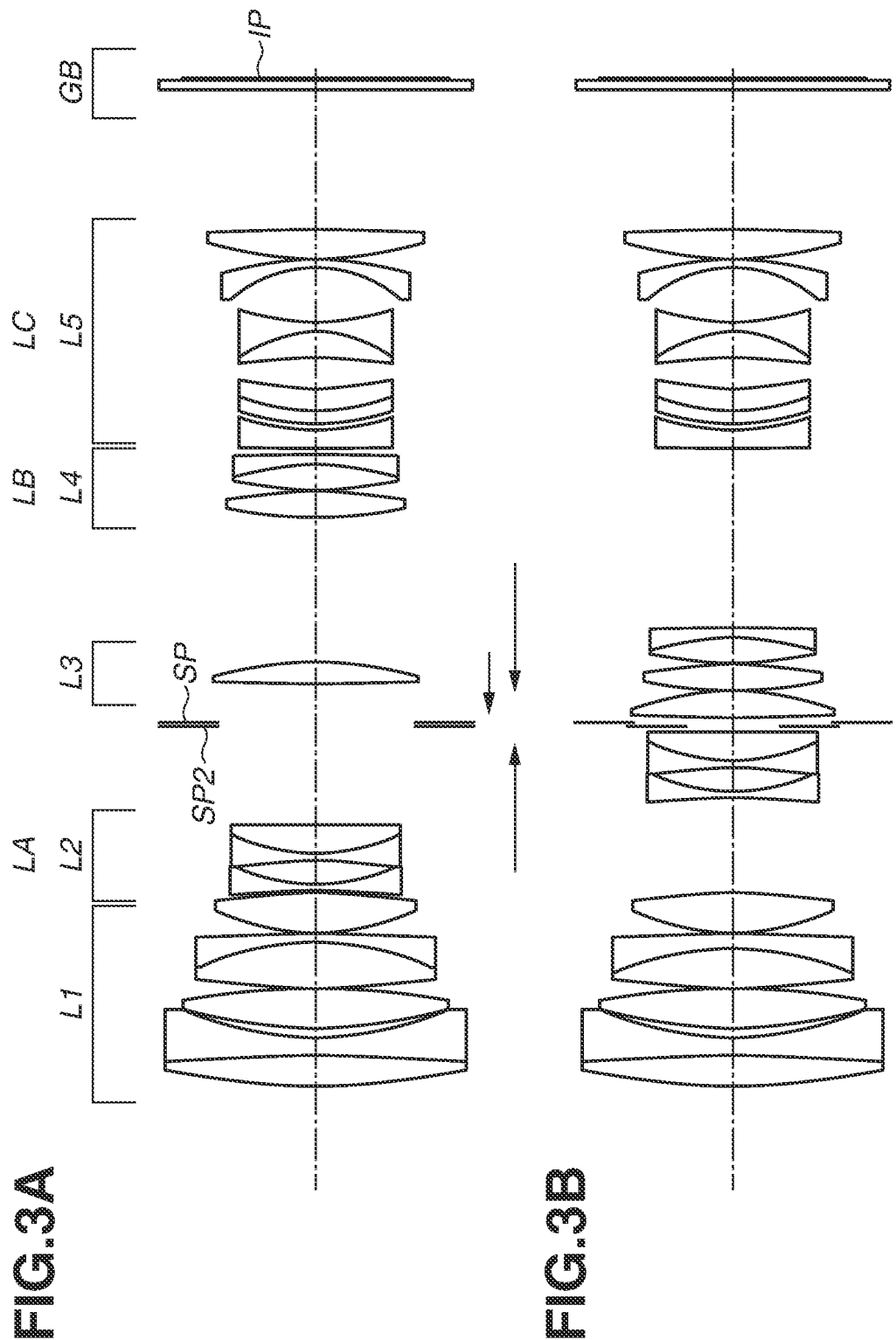
FIGS. 3A and 3B are cross-sectional diagrams of an optical system according to a second exemplary embodiment.
Figure 4A:
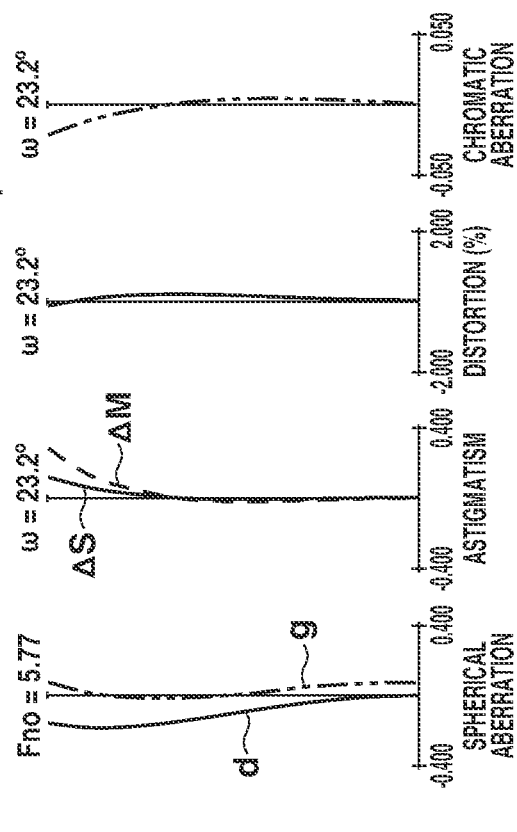
FIGS. 4A, 4B, 4C, and 4D are aberration diagrams of the optical system according to the second exemplary embodiment.
Figure 4B:
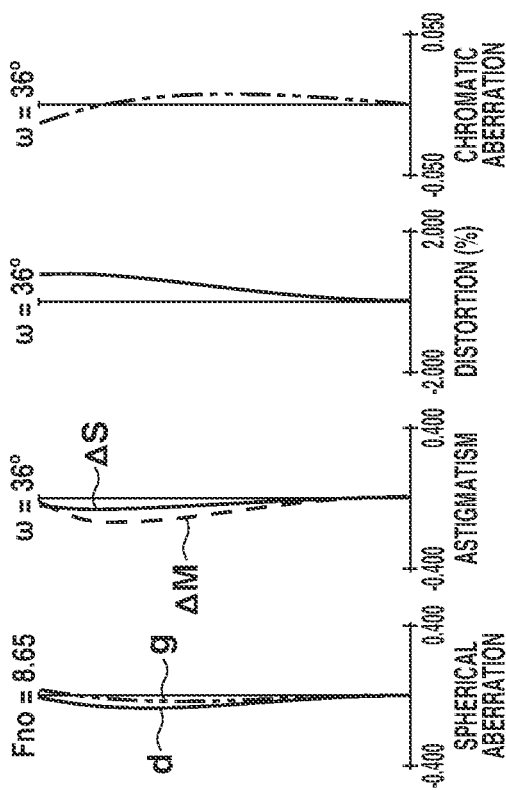
Figure 4C:
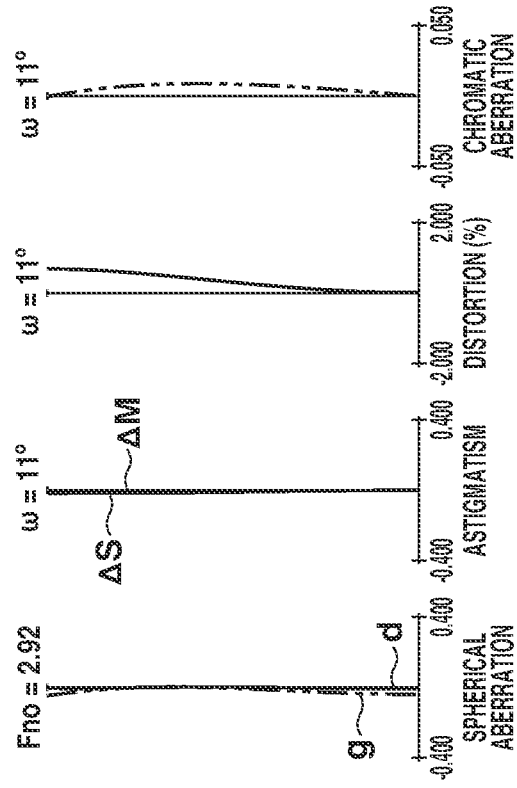
Figure 4D:
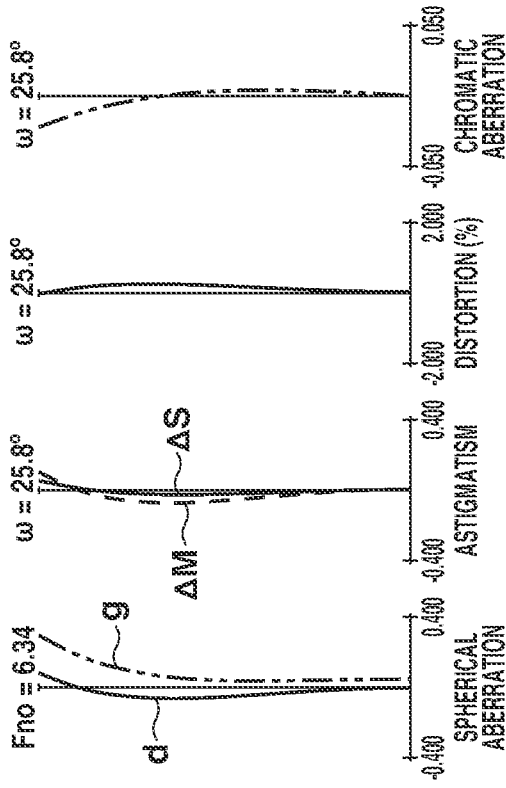
Figure 7A:
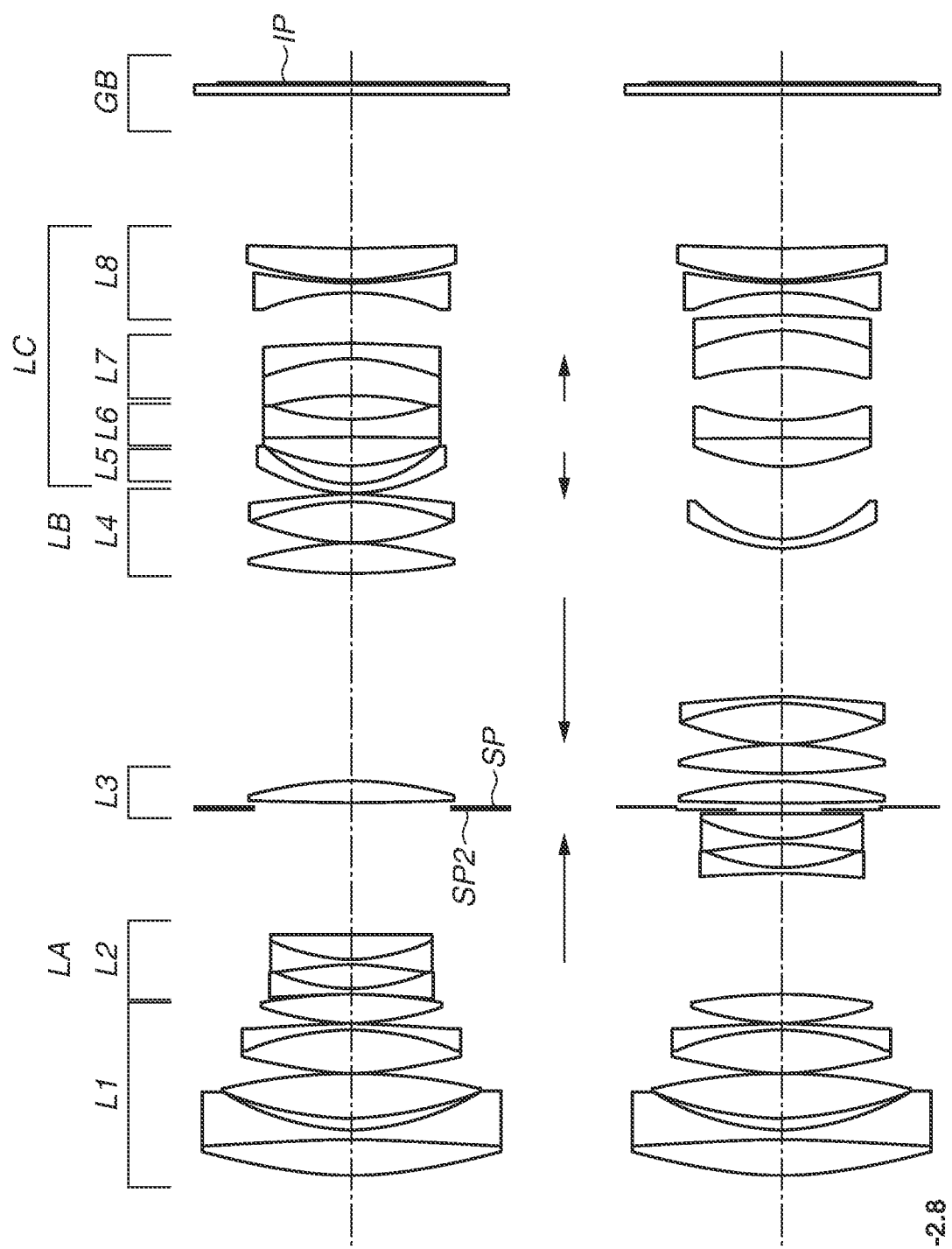
Figure 10A:
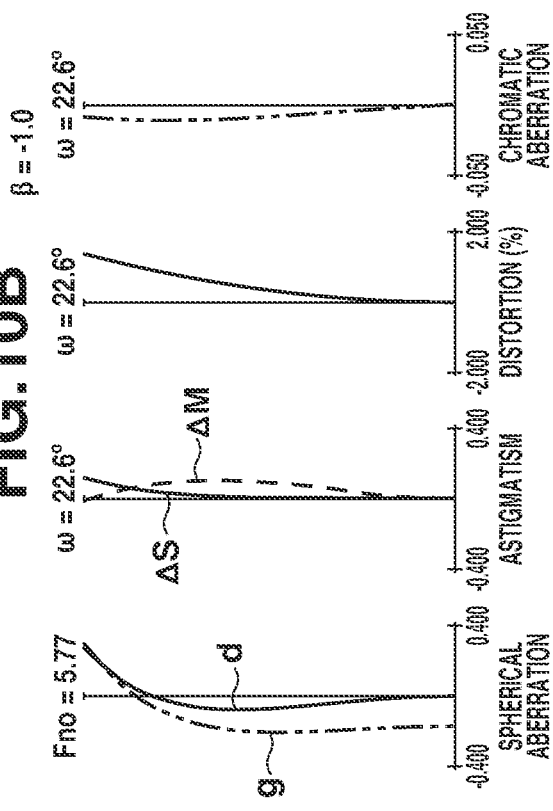
FIGS. 10A, 10B, 10C, and 10D are aberration diagrams of the optical system according to the fifth exemplary embodiment.
Figure 10B:
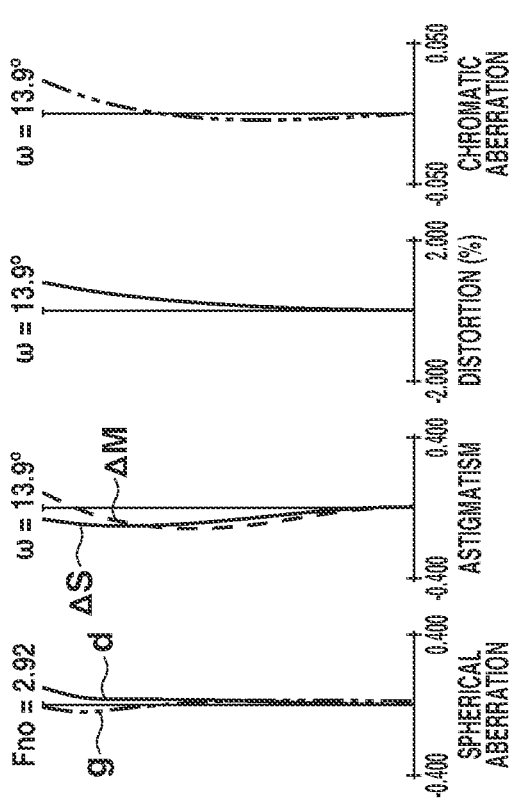
Figure 10C:
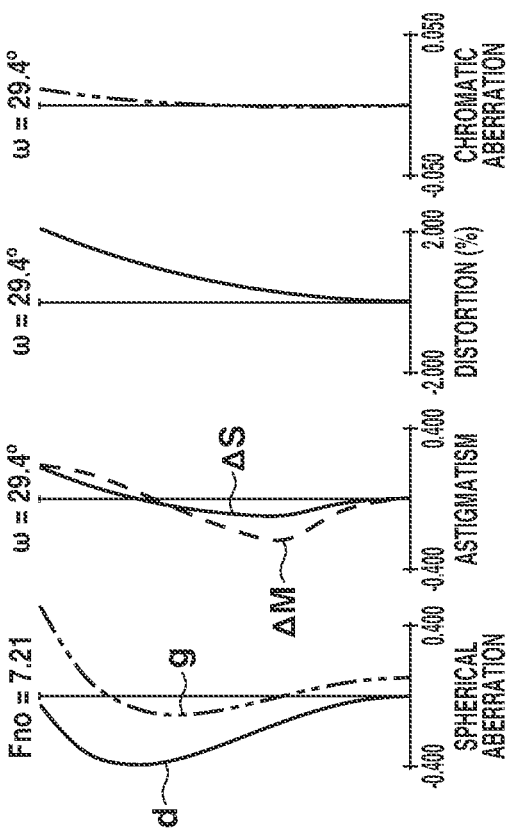
Figure 10D:
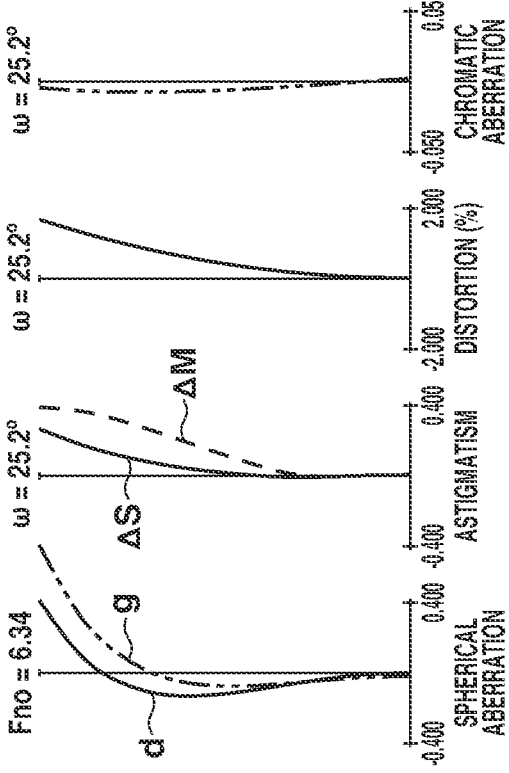
Figures 11A, 11B:
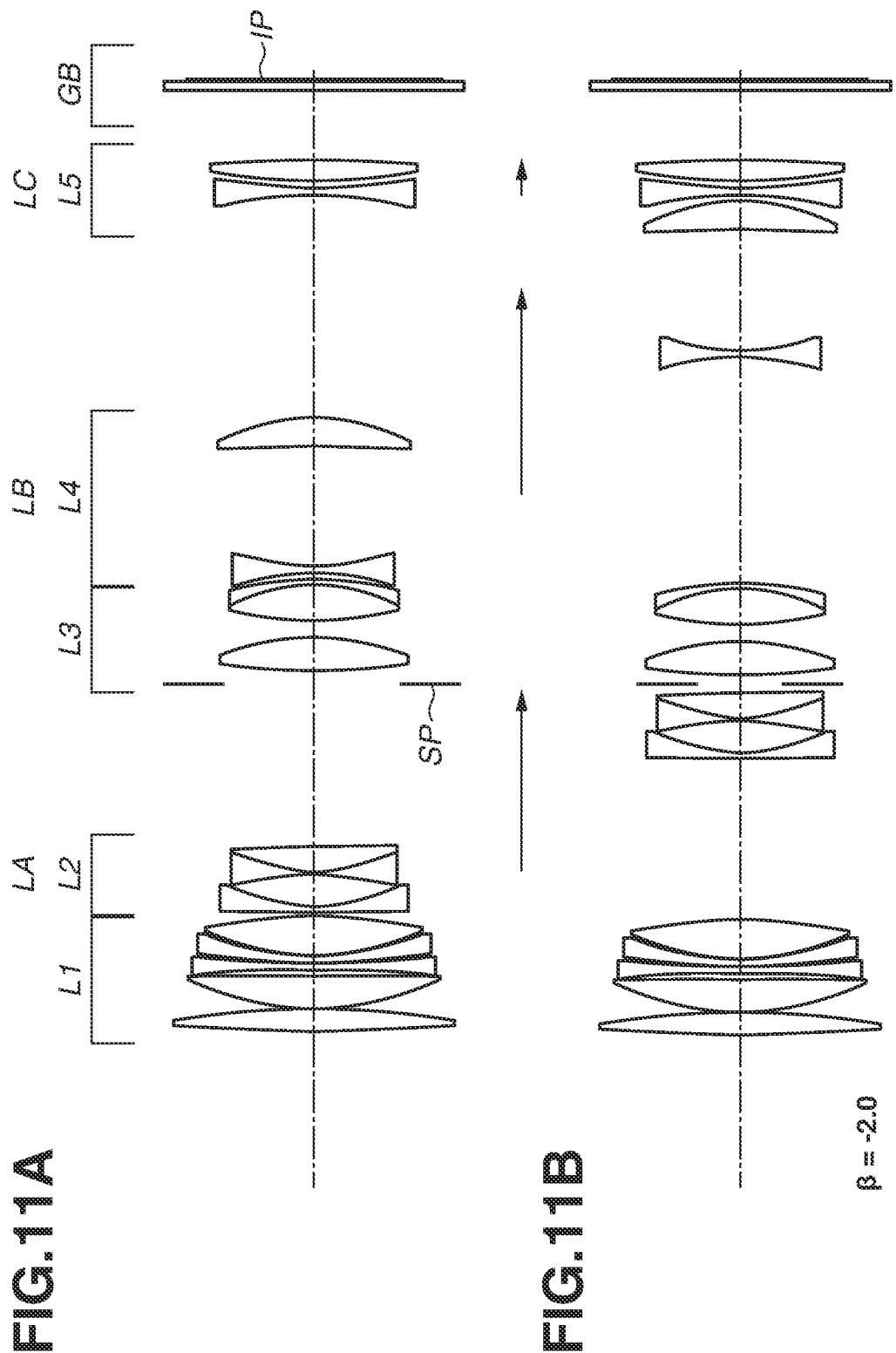
FIGS. 11A and 11B are cross-sectional diagrams of an optical system according to a sixth exemplary embodiment.
Figure 12A:
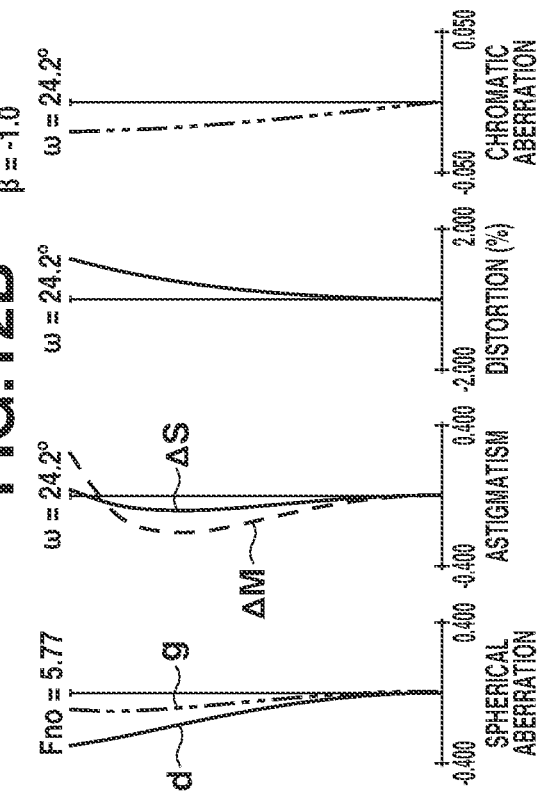
FIGS. 12A, 12B, 12C, and 12D are aberration diagrams of the optical system according to the sixth exemplary embodiment.
Figure 12B:
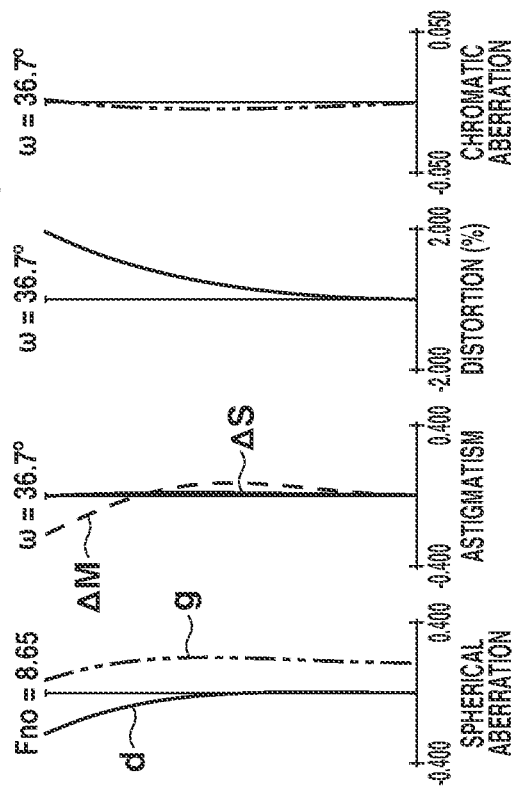
Figure 12C:
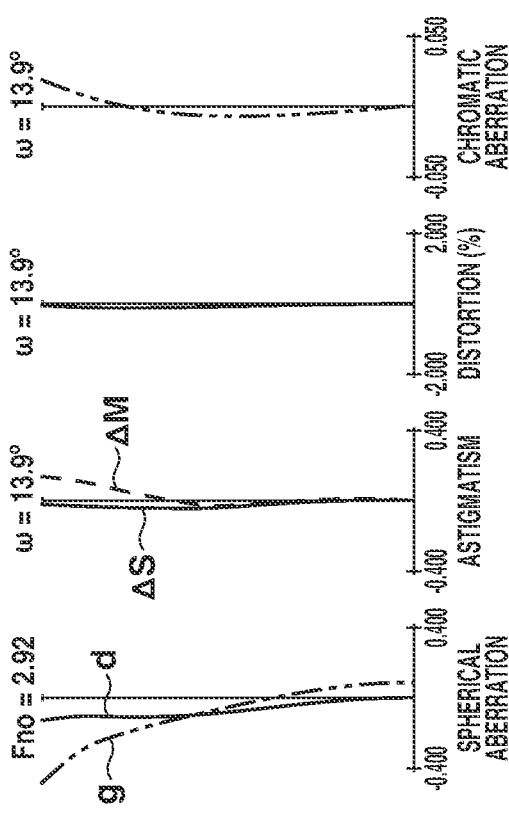
Figure 12D:
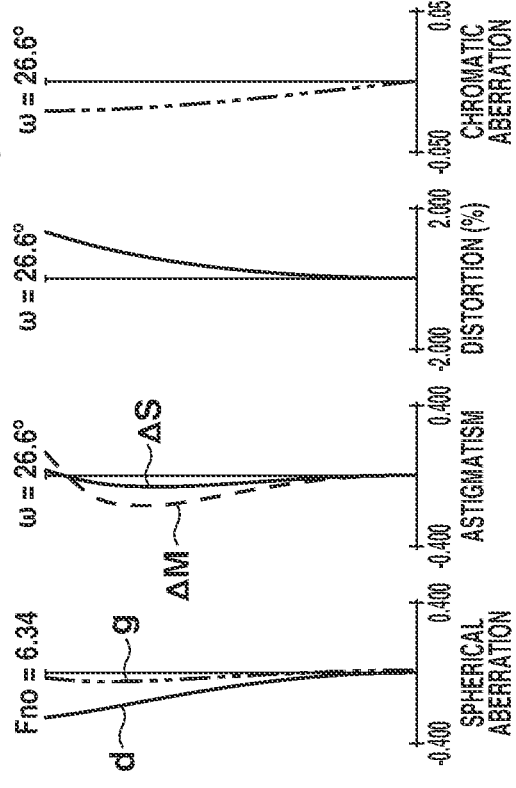
Figure 14A:
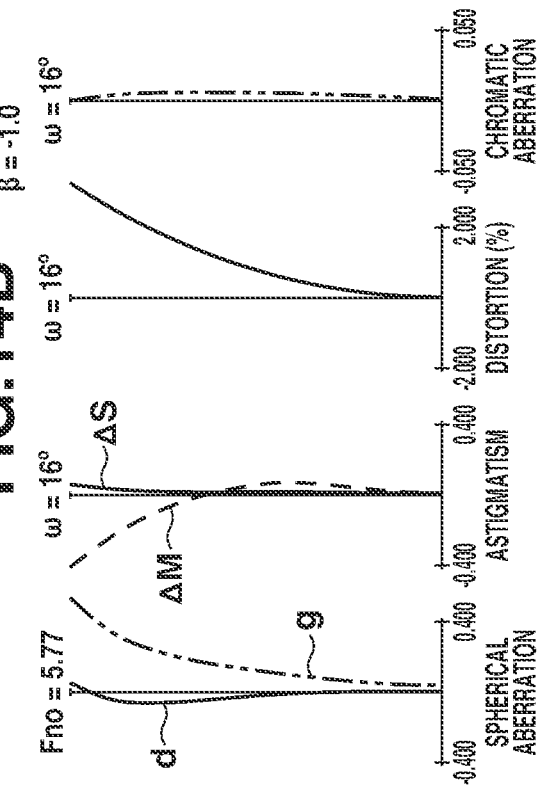
FIGS. 14A, 14B, 14C, and 14D are aberration diagrams of the optical system according to the seventh exemplary embodiment.
Figure 14B:
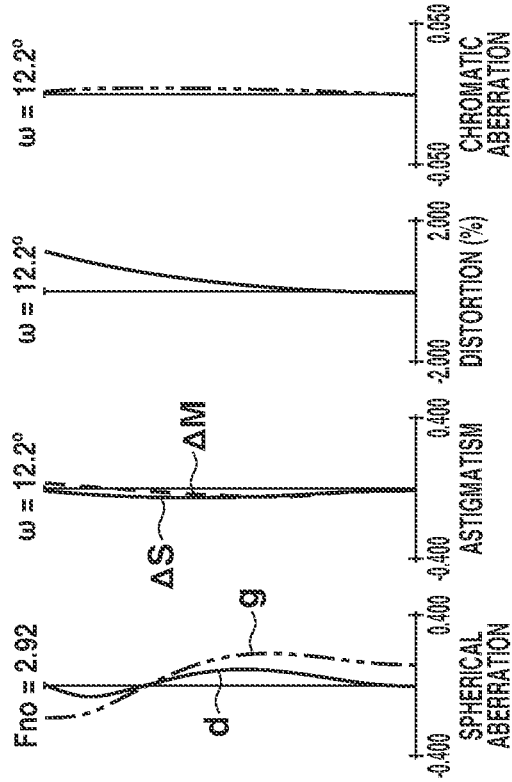
Figure 14C:
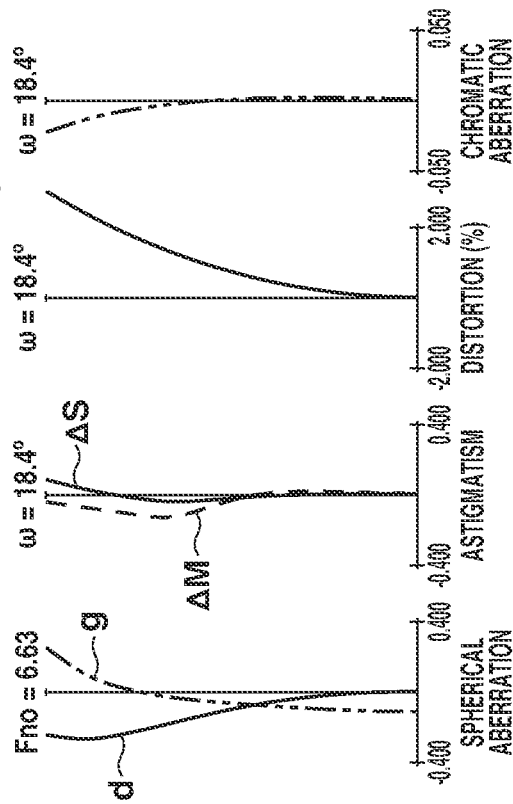
Figure 14D:
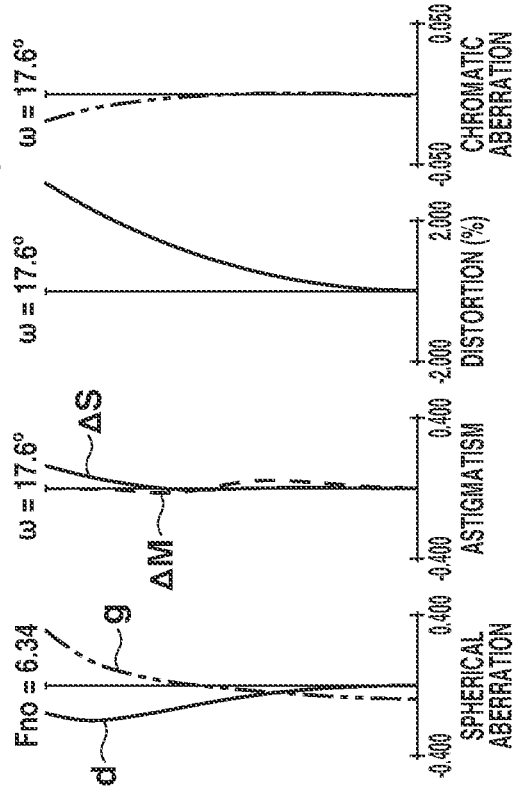
Figure 16A:
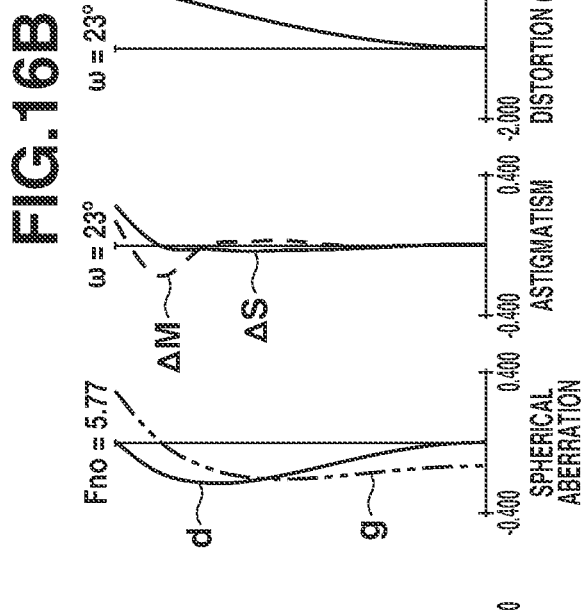
FIGS. 16A, 16B, 16C, and 16D are aberration diagrams of the optical system according to the eighth exemplary embodiment.
Figure 16B:
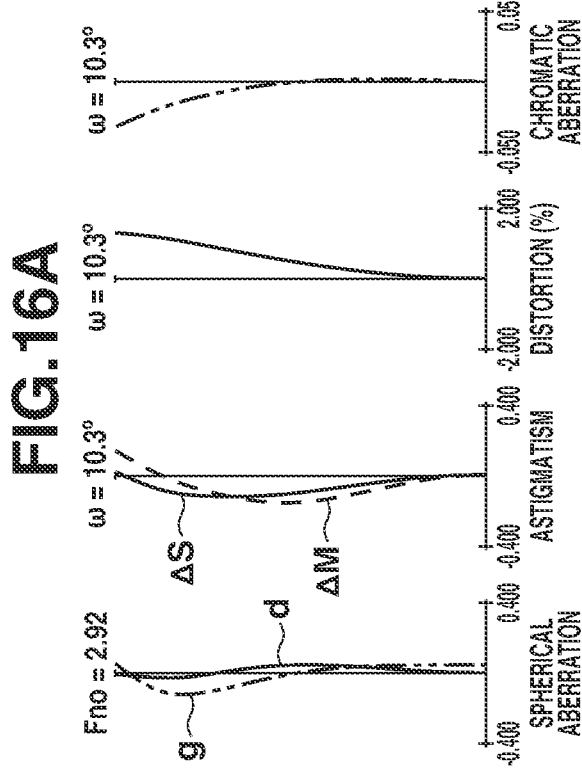
Figure 16C:
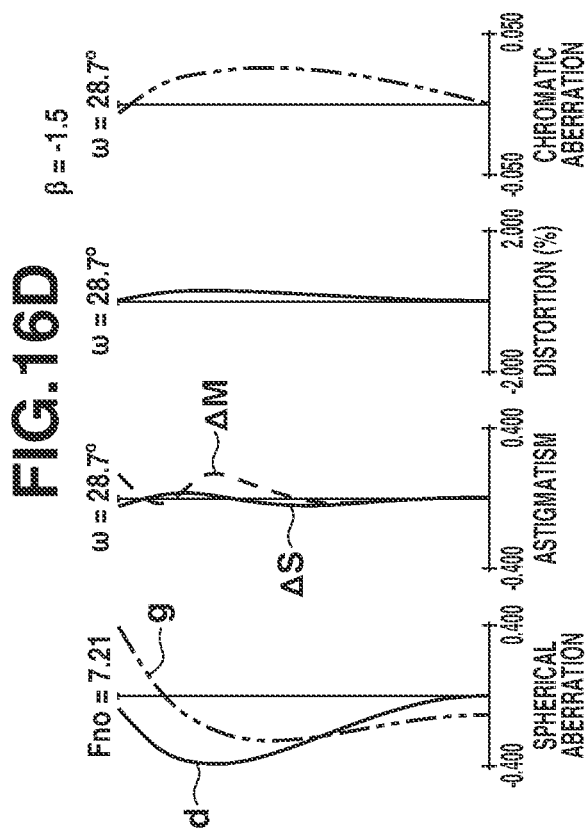
Figure 16D:
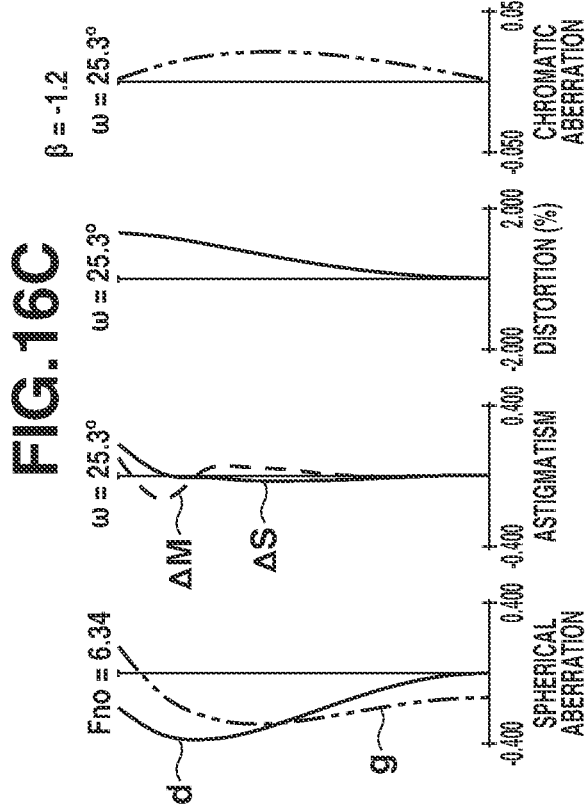

An optical system according to an exemplary embodiment of the present invention, and an imaging apparatus including the optical system will be described based on the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

FIGS. 1A, 3A, 5A, 7A, 9A, 11A, 13A, and 15A are cross-sectional diagrams of optical systems according to first to eighth exemplary embodiments, each illustrating an in-focus state on an infinite-distance object. FIGS. 1B, 3B, 5B, 7B, 9B, 11B, 13B, and 15B are cross-sectional diagrams of the optical systems according to the first to eighth exemplary embodiments, each illustrating aa in-focus state on a finite-distance object. An imaging magnification set in this state is illustrated in each diagram. The optical system according to each of the exemplary embodiments is an optical system used in an imaging apparatus such as digital video cameras, digital still cameras, broadcasting cameras, silver-halide film cameras, or monitoring cameras.

In each of the lens cross-sectional diagrams, the left side corresponds to an object side and the right side corresponds to an image side. The optical system according to each of the exemplary embodiments includes a plurality of lens units. In this disclosure, a lens unit refers to a group of lenses integrally moving or stopping in focusing. In other words, in the optical system according to each of the exemplary embodiments, an interval between adjacent lens units changes in focusing from an infinite-distance object to a close-distance object. In addition, a lens unit may only include a single lens or may include a plurality of lenses. In addition, a lens unit may include an aperture stop.

In each of the lens cross-sectional diagrams, "Li" denotes an i-th lens unit disposed at an i-th ("i" is a natural number) position when being counted from the object side. In addition, "SP" denotes a main stop (aperture stop) for determining (limiting) an F-number (Fno) light beam, and "SP2" denotes a sub stop for reducing a stop diameter in accordance with a change in imaging magnification and cutting unnecessary light rays. "IP" denotes an image plane. When the optical system according to each of the exemplary embodiments is used as an imaging optical system of a digital still camera or a digital video camera, an imaging plane of a solid-state image sensor (photoelectric conversion device) such as a charge-coupled device (CCD) sensor or a complementary metal-oxide semiconductor (CMOS) sensor is disposed at the image plane IP. When the optical system according to each of the exemplary embodiments is used as an imaging optical system of a silver-halide film camera, a photosensitive surface corresponding to a film surface is placed at the image plane IP. "GB" denotes an optical filter placed on the object side of the image plane IP.

In addition, the optical system according to each of the exemplary embodiments includes a plurality of focus lens units. A focus lens unit refers to a lens unit moving in focusing. Arrows illustrated in each of the lens cross-sectional diagrams indicate moving directions of the focus lens units in focusing from an infinite-distance object to a close-distance object.

FIGS. 2A, 2B, 2C, 2D, 4A, 4B, 4C, 4D, 6A, 6B, 6C, 6D, 8A, 8B, 8C, 8D, 10A, 10B, 10C, 10D, 12A, 12B, 12C, 12D, 14A, 14B, 14C, 14D, 16A, 16B, 16C, and 16D are aberration diagrams of the optical systems according to the first to eighth exemplary embodiments. In the aberration diagrams, aberration diagrams illustrated in FIGS. 2A, 4A, 6A, 8A, 10A, 12A, 14A, and 16A are aberration diagrams illustrating an in-focus state on an infinite-distance object, and aberration diagrams illustrated in FIGS. 2B to 2D, 4B to 4D, 6B to 6D, 8B to 8D, 10B to 10D, 12B to 12D, 14B to 14D, and 16B to 16D are aberration diagrams illustrating an in-focus state on a finite-distance object. Lateral magnifications in the aberration diagrams illustrated in FIGS. 2B to 2D, 4B to 4D, 6B to 6D, 8B to 8D, 10B to 10D, 12B to 12D, 14B to 14D, and 16B to 16D are as illustrated in the corresponding aberration diagrams.

In each spherical aberration diagram, "Fno" denotes an F-number, and spherical aberration amounts with respect to d-line (wavelength of 587.6 nm) and g-line (wavelength of 435.8 nm) are illustrated. In each astigmatism diagram, "$\Delta S$" denotes an astigmatism amount on a sagittal image plane, and "$\Delta M$" denotes an astigmatism amount on a meridional image plane. In each distortion aberration diagram, a distortion aberration amount with respect to d-line is illustrated. In each chromatic aberration diagram, a chromatic aberration amount in g-line is illustrated. In aberration diagrams, "$\omega$" denotes an imaging half field angle (°).

Next, a characteristic configuration of the optical system according to each of the exemplary embodiments will be described.

The optical system according to each of the exemplary embodiments is a macro lens that can perform image capturing at least in an in-focus state in which $\beta=-1.2$ is obtained. Hereinafter, the in-focus state in which $\beta=-1.2$ is obtained will be referred to as a first in-focus state.

If a total lens length of a macro lens is to be shortened, it sometimes becomes difficult to achieve both the correction of spherical aberration or comatic aberration, and the correction of field curvature especially in an in-focus state on a close-distance object. For this reason, in the optical system according to each of the exemplary embodiments, a so-called floating system is employed by providing a plurality of focus lens units. Hereinafter, in the optical system according to each of the exemplary embodiments, out of a lens unit having the largest absolute value of a focus sensitivity and a lens unit having the second largest absolute value of a focus sensitivity among a plurality of focus lens units in an in-focus state on an infinite-distance object, a lens unit disposed on the object side will be referred to as a first focus lens unit LA, and a lens unit disposed on the image side will be referred to as a second focus lens unit LB. The first and second focus lens units LA and LB can be said to be lens units having a main focusing function in the optical system according to each of the exemplary embodiments. In addition, a focus sensitivity ESi of an arbitrary lens unit Li is defined by the following expression:

$$ESi = (1 - \beta i^2) \times \beta r^2,$$

where a lateral magnification of the lens unit Li in an in-focus state on an infinite-distance object is denoted by βi, and a combined lateral magnification of all lens units disposed on the image side of the lens unit Li is denoted by βr.

When the floating system is employed, if an imaging magnification is to be increased to such a degree that image capturing can be performed in the first in-focus state, an amount of movement of each focus lens unit becomes large. For this reason, it becomes necessary to secure an amount of movement of each focus lens unit, and it becomes difficult to shorten a total lens length.

Thus, in the optical system according to each of the exemplary embodiments, refractive power of a partial optical system LC including all the lenses disposed on the image side of the second focus lens unit LB is appropriately set. The optical system according to each of the exemplary embodiments can thereby have high optical performance while being compact, and can further perform image capturing at high imaging magnification i.e., a same magnification or more.

Specifically, in the optical system according to each of the exemplary embodiments, the partial optical system LC has negative refractive power. With this configuration, because it is possible to dispose an exit pupil at a position close to the image plane, it is possible to shorten a back focus. This enables the total lens length to be shortened. In addition, by setting negative refractive power as refractive power of the partial optical system LC, it is possible to reduce a lens diameter of a lens disposed at a position close to the image plane in the optical system.

In addition, the optical system according to each of the exemplary embodiments satisfies the following Conditional Expression (1):

$$-3.00 < fLCX/fX < -0.50 \quad (1),$$

where fLCX is a focal length of the partial optical system LC in the first in-focus state, and fX is a focal length of the entire optical system in the first in-focus state.

Conditional Expression (1) defines a relationship between a focal length of the entire system and a focal length of the partial optical system LC in the first in-focus state. By satisfying Conditional Expression (1), it is possible to achieve both the correction of distortion aberration or magnification chromatic aberration and the shortening of the total lens length.

If a value of fLCX/fX exceeds an upper limit of Conditional Expression (1), a back focus becomes too short. In this case, it is advantageous for the shortening of the total lens length, but it becomes difficult to correct distortion aberration and/or magnification chromatic aberration. It is possible to correct aberration by increasing the number of lenses of the partial optical system LC, but in this case, the total lens length is consequently increased.

If negative refractive power of the focal length fCLX becomes smaller or the focal length fX becomes smaller to such a degree that a value of fLCX/fX falls below a lower limit of Conditional Expression (1), it becomes difficult to secure a working distance in enlarged image capturing. In addition, it is advantageous for the correction of spherical aberration and/or comatic aberration, but a back focus becomes larger and the total lens length is increased.

In addition, it is more desirable to set a numerical value range of Conditional Expression (1) to a range of the following Conditional Expression (1a), and it is further desirable to set the numerical value range to a range of Conditional Expression (1b).

$$-2.70 < fLCX/fX < -0.60 \quad (1a)$$

$$-2.30 < fLCX/fX < -0.63 \quad (1b)$$

With the configuration described above, the optical system according to each of the exemplary embodiments can perform image capturing at an imaging magnification of a same magnification or more, and can be compact while having high optical performance.

Next, conditions to be desirably satisfied by the optical system according to each of the exemplary embodiments will be described. The optical system according to each of the exemplary embodiments desirably satisfies one or more conditional expressions of the following Conditional Expressions (2) to (11). In Conditional Expression (2), fLCY is a focal length of the partial optical system LC in a second in-focus state in which β=−1.0 is obtained, and f is a focal length of the entire optical system in a state in which focus is put on an infinite-distance object. In Conditional Expression (3), fLA is a focal length of the first focus lens unit LA. In Conditional Expression (4), sk is a distance from an image-side lens surface of a lens disposed closest to the image side in the optical system, to the image plane that is set in a state in which focus is put on an infinite-distance object (a back focus in air conversion). In Conditional Expression (5), ESA is a focus sensitivity of the first focus lens unit LA in a state in which focus is put on an infinite-distance object. In Conditional Expression (6), ESB is a focus sensitivity of the second focus lens unit LB in a state in which focus is put on an infinite-distance object. In Conditional Expression (7), MA is an amount of movement of the first focus lens unit LA moved from a state in which focus is put on an infinite-distance object, until the second in-focus state ((β=−1.0) is caused, and MB is an amount of movement of the second focus lens unit LB moved from a state in which focus is put on an infinite-distance object, until the second in-focus state is caused. In Conditional Expression (8), Di is a distance from the aperture stop SP to the image plane IP in a state in which focus is put on an infinite-distance object. In Conditional Expression (9), fL1 is a focal length of a first lens unit L1 in a state in which focus is put on an infinite-distance object. In Conditional Expression (10), fI is a focal length of a lens disposed closest to the image side in the optical system. In addition, a lens disposed closest to the image side is a single lens element in the optical system according to each of the exemplary embodiments, but a lens disposed closest to the image side may be a cemented lens. In this case, fI is a focal length in air of a lens disposed closest to the image side among the cemented lens disposed closest to the image side (a focal length obtainable when the cemented lens is separated and each of the separated lenses is regarded as a single lens element). In Conditional Expression (11), βm is a lateral magnification obtainable when an imaging magnification is largest in the optical system according to each of the exemplary embodiments.

$$-1.20 < fLCY/f < -0.20 \quad (2)$$

$$0.10 < |fLAK| < 0.50 \quad (3)$$

$$-1.00 < sk/fLCY < -0.10 \quad (4)$$

$$2.50 < |ESA| < 7.50 \quad (5)$$

$$0.10 < |ESB| < 6.00 \quad (6)$$

$$0.05 < (|MA| + |MB|)/f < 0.60 \quad (7)$$

$$0.50 < Di/f < 1.50 \quad (8)$$

$$0.10 < fL1/f < 2.50 \quad (9)$$

$$0.25 < fl/f < 2.20 \quad (10)$$

$$-5.0 < \beta m < -1.2 \quad (11)$$

Conditional Expression (2) defines a relationship between the focal length fLCY of the partial optical system LC and a focal length of the entire system in the second in-focus state. By satisfying Conditional Expression (2), it is possible to achieve both an increase in imaging magnification and further shortening of the total lens length.

If a value of fLCY/f exceeds an upper limit of Conditional Expression (2), it is advantageous for the shortening of the total lens length, but it becomes easier to generate distortion aberration and/or magnification chromatic aberration, which is undesirable.

If a value of fLCY/f falls below a lower limit of Conditional Expression (2), it becomes difficult to shorten a back focus and the total lens length is increased. Thus, it becomes difficult to sufficiently shorten the total lens length.

Conditional Expression (3) defines a relationship between a focal length of the first focus lens unit LA and a focal length of the entire system. By satisfying Conditional Expression (3), it is possible to reduce an amount of movement in focusing while maintaining optical performance, and to further shorten the total lens length.

If a value of |fLA/f| exceeds an upper limit of Conditional Expression (3), refractive power of the first focus lens unit LA decreases and an amount of movement in focusing consequently increases. As a result, it becomes difficult to sufficiently shorten the total lens length.

If a value of |fLA/f| falls below a lower limit of Conditional Expression (3), refractive power of the first focus lens unit LA increases and an amount of change in spherical aberration and/or field curvature in focusing consequently increases.

Conditional Expression (4) defines a relationship between a back focus of the optical system and a focal length of the partial optical system LC in the second in-focus state. By satisfying Conditional Expression (4), it is possible to further reduce a lens diameter of the partial optical system LC.

If a value of sk/fLCY exceeds an upper limit of Conditional Expression (4), a back focus becomes too short. In this case, it becomes difficult to dispose a shutter member or the like, and it becomes difficult to use the optical system according to each of the exemplary embodiments as an imaging optical system of an imaging apparatus such as a digital still camera.

If a value of sk/fLCY falls below a lower limit of Conditional Expression (4), a back focus becomes too long and a lens diameter increases. As a result, it becomes difficult to obtain a sufficiently-compact optical system.

Conditional Expression (5) defines the focus sensitivity ESA of the first focus lens unit LA.

If a value of |ESA| exceeds an upper limit of Conditional Expression (5), a change in field angle caused by focusing becomes large, which is undesirable. In addition, an amount of change in spherical aberration and/or field curvature in focusing may become large.

If a value of |ESA| falls below a lower limit of Conditional Expression (5), an amount of movement of the first focus lens unit LA in focusing increases. As a result, it becomes difficult to sufficiently shorten the total lens length.

Conditional Expression (6) defines the focus sensitivity ESB of the second focus lens unit LB.

If a value of |ESB| exceeds an upper limit of Conditional Expression (6), an amount of change in field curvature caused by focusing becomes large, which is undesirable.

If a value of |ESB| falls below a lower limit of Conditional Expression (6), an amount of movement of the second focus lens unit LB in focusing increases. As a result, it becomes difficult to sufficiently shorten the total lens length.

Conditional Expression (7) defines a relationship between moving distances of the first focus lens unit LA and the second focus lens unit LB, and the focal length of the entire system. By satisfying Conditional Expression (7), it is possible to further shorten the total lens length.

If a value of (|MA|+|MB|)/f exceeds an upper limit of Conditional Expression (7), it is advantageous for the suppression of an amount of change in spherical aberration and/or of field curvature in focusing becomes, but an amount of movement in focusing increases. For this reason, it becomes difficult to sufficiently shorten the total lens length.

If a value of (|MA|+|MB|)/f falls below a lower limit of Conditional Expression (7), it becomes difficult to ensure an amount of movement of a focus lens unit required for changing an imaging magnification in focusing, while achieving a sufficiently-compact optical system.

Conditional Expression (8) defines a relationship between a distance from the aperture stop SP to the image plane, and the focal length of the entire system. By satisfying Conditional Expression (8), it is possible to reduce a diameter of a lens disposed on the image side of the aperture stop SP, while increasing an imaging magnification.

If a value of Di/f exceeds an upper limit of Conditional Expression (8), because an amount of movement of a focus lens unit disposed on the image side of the aperture stop SP becomes large, the optical system upsizes.

If a value of Di/f falls below a lower limit of Conditional Expression (8), an amount of movement of a focus lens unit disposed on the object side of the aperture stop SP becomes too small, and an amount of change in spherical aberration and/or field curvature in focusing increases.

Conditional Expression (9) defines a relationship between a focal length of the lens unit L1 and a focal length of the entire system in an in-focus state on an infinite-distance object. By satisfying Conditional Expression (9), it is possible to achieve both the further shortening of the total lens length and the suppression of spherical aberration.

If a value of fL1/f exceeds an upper limit of Conditional Expression (9), it is advantageous for the suppression of generation of spherical aberration and/or comatic aberration, but the total lens length is prone to increase.

If a value of fL1/f falls below a lower limit of Conditional Expression (9), refractive power of the first lens unit L1 becomes too high, and a comatic aberration sensitivity of the first lens unit L1, when the first lens unit L1 is decentered, becomes higher. Thus, excessive accuracy is required in the manufacturing of an optical system, which is undesirable.

Conditional Expression (10) defines a relationship between a focal length of the entire system and a focal length of a lens disposed at a position closest to the image plane, in an in-focus state on an infinite-distance object. By satisfying Conditional Expression (10), it is possible to reduce a lens diameter of the partial optical system LC.

If a value of fl/f exceeds an upper limit of Conditional Expression (10), it becomes difficult to shorten a back focus. As a result, it becomes difficult to obtain a sufficiently-compact optical system.

If a value of fl/f falls below a lower limit of Conditional Expression (10), refractive power of a lens disposed closest to the image side becomes too high, and it becomes easier to generate distortion aberration and/or magnification chromatic aberration. As a result, it becomes difficult to reduce a lens diameter of the partial optical system LC when optical performance is to be maintained.

Conditional Expression (11) defines a maximum imaging magnification in each of the exemplary embodiments.

If a value of βm exceeds an upper limit of Conditional Expression (11), a lateral magnification when an imaging magnification becomes maximum becomes insufficient. As a result, it becomes difficult to perform image capturing while sufficiently enlarging a subject, which is undesirable.

If a value of βm falls below a lower limit of Conditional Expression (11), an absolute value of a lateral magnification when an imaging magnification becomes maximum becomes too large. As a result, it becomes difficult to sufficiently shorten the total lens length while maintaining optical performance, which is undesirable.

In addition, it is more desirable to set numerical value ranges of Conditional Expressions (2) to (11) to ranges of the following Conditional Expressions (2a) to (11a).

$$-1.10 < fLCY/f < -0.25 \quad (2a)$$

$$0.15 < |fLAK|/f < 0.45 \quad (3a)$$

$$-0.95 < sk/fLCY < -0.15 \quad (4a)$$

$$2.70 < |ESA| < 7.30 \quad (5a)$$

$$2.30 < |ESB| < 5.70 \quad (6a)$$

$$0.10 < (|MA|+|MB|) < 0.50 \quad (7a)$$

$$0.60 < Di/f < 1.35 \quad (8a)$$

$$0.20 < fL1/f < 2.20 \quad (9a)$$

$$0.30 < fl/f < 2.00 \quad (10a)$$

$$-4.00 < \beta m < -1.23 \quad (11a)$$

In addition, it is further desirable to set numerical value ranges of Conditional Expressions (2) to (11) to ranges of the following Conditional Expressions (2b) to (11b).

$$-1.05 < fLCY/f < -0.28 \quad (2b)$$

$$0.17 < |fLA/f| < 0.40 \quad (3b)$$

$$-0.90 < sk/fLCY < -0.20 \quad (4b)$$

$$2.80 < |ESA| < 7.20 \quad (5b)$$

$$2.40 < |ESB| < 5.60 \quad (6b)$$

$$0.15 < (|MA|+|MB|)/f < 0.47 \quad (7b)$$

$$0.63 < Di/f < 1.30 \quad (8b)$$

$$0.30 < fL1/f < 2.10 \quad (9b)$$

$$0.35 < fl/f < 1.90 \quad (10b)$$

$$-3.50 < \beta m < -1.26 \quad (11b)$$

Next, a desirable configuration of the optical system according to each of the exemplary embodiments will be described.

In the optical system according to each of the exemplary embodiments, a lens disposed at a position closest to the image plane IP desirably has positive refractive power. When a lens disposed at a position closest to the image plane IP is a cemented lens, a lens disposed closest to the image side among the cemented lens desirably has positive refractive power in air. In a lens having a large imaging magnification such as a macro lens, a change in height of an off-axis light ray caused by focusing from an infinite-distance object to a close-distance object is likely to be larger than that of a normal lens. By disposing a positive lens at a position closest to the image side, it is possible to prevent an exit pupil from coming excessively on the image plane IP. With this configuration, it becomes possible to suppress a variation in magnification chromatic aberration and/or distortion aberration caused by focusing.

In addition, when more focus lens units are provided, it is possible to further reduce a variation in optical performance caused by focusing, but control of the lenses becomes complicated. In addition, a mechanism for moving the focus lens units becomes complicated, and the optical system may become large. For this reason, it is desirable that the number of focus lens units moving in focusing is to be three or less in each of the exemplary embodiments. In other words, it is desirable that the number of focus lens units is two or three.

In addition, in order to further shorten the total lens length, the first lens unit L1 desirably has positive refractive power. In addition, when the first lens unit L1 has positive refractive power, the first focus lens unit LA desirably has negative refractive power. With this configuration, it becomes possible to appropriately correct various types of aberration generated in the first lens unit L1.

In addition, in the optical system according to each of the exemplary embodiments, it is desirable that the first focus lens unit LA and the second focus lens unit LB are disposed on opposite sides with respect to the aperture stop SP. More specifically, it is desirable that the first focus lens unit LA is disposed on a light incident side of the aperture stop SP, and the second focus lens unit LB is disposed on a light emission side of the aperture stop SP. On the light incident side of the aperture stop SP, the height of an on-axis light ray is relatively high, and on the light emission side of the aperture stop SP, the height of an off-axis light ray is relatively high. For this reason, by disposing the first focus lens unit LA and the second focus lens unit LB on opposite sides with respect to the aperture stop SP, it becomes possible to effectively reduce an amount of change in optical performance caused by focusing, over a wide range of a screen.

In addition, the first focus lens unit LA desirably includes three or more lenses including a negative lens and a positive lens. In addition, the second focus lens unit LB desirably includes two or more lenses including a negative lens and a positive lens. This is because, by a focus lens unit including a negative lens and a positive lens, it is possible to suppress the generation of on-axis chromatic aberration and/or magnification chromatic aberration in focusing.

In addition, the first lens unit L1 is desirably immovable in focusing. With this configuration, it is possible to reduce a shift in gravity center of the optical system in focusing, and enhance operability in focusing.

Next, the optical system according to each of the exemplary embodiments will be described in detail.

The optical system according to the first exemplary embodiment includes, in order from the object side to the image side, the first lens unit L1 having positive refractive power, a second lens unit L2 having negative refractive power, a third lens unit L3 including the aperture stop SP and having positive refractive power, a fourth lens unit L4 having positive refractive power, and a fifth lens unit L5 having negative refractive power. The second lens unit L2 corresponds to the first focus lens unit LA, and moves toward the image side in focusing from an infinite-distance object to a close-distance object. The fourth lens unit L4 corresponds to the second focus lens unit LB, and moves toward the object side in focusing from an infinite-distance object to a close-distance object. The fifth lens unit L5 corresponds to the partial optical system LC. The lateral magnification βm of the optical system according to the first exemplary embodiment is −2.0.

The optical system according to the second exemplary embodiment includes, in order from the object side to the image side, the first lens unit L1 having positive refractive power, the second lens unit L2 having negative refractive power, the aperture stop SP, the third lens unit L3 having positive refractive power, the fourth lens unit L4 having positive refractive power, and the fifth lens unit L5 having negative refractive power. The second lens unit L2 corresponds to the first focus lens unit LA, and moves toward the image side in focusing from an infinite-distance object to a close-distance object. The fourth lens unit L4 corresponds to the second focus lens unit LB, and moves toward the object side in focusing from an infinite-distance object to a close-distance object. The fifth lens unit L5 corresponds to the partial optical system LC. In addition, the third lens unit L3 moves toward the object side in focusing from an infinite-distance object to a close-distance object. The lateral magnification βm of the optical system according to the second exemplary embodiment is −2.0.

The optical system according to the third exemplary embodiment includes, in order from the object side to the image side, the first lens unit L1 having positive refractive power, the second lens unit L2 having negative refractive power, the aperture stop SP, the third lens unit L3 having positive refractive power, the fourth lens unit L4 having negative refractive power, and the fifth lens unit L5 having positive refractive power. The second lens unit L2 corresponds to the first focus lens unit LA, and moves toward the image side in focusing from an infinite-distance object to a close-distance object. The third lens unit L3 corresponds to the second focus lens unit LB, and moves toward the object side in focusing from an infinite-distance object to a close-distance object. A partial optical system including the fourth lens unit L4 and the fifth lens unit L5 has negative refractive power, and corresponds to the partial optical system LC. In addition, the fourth lens unit L4 moves toward the object side in focusing from an infinite-distance object to a close-distance object. The lateral magnification βm of the optical system according to the third exemplary embodiment is −1.5.

The optical system according to the fourth exemplary embodiment includes, in order from the object side to the image side, the first lens unit L1 having positive refractive power, the second lens unit L2 having negative refractive power, the third lens unit L3 including the aperture stop SP and having positive refractive power, the fourth lens unit L4 having positive refractive power, the fifth lens unit L5 having negative refractive power, a sixth lens unit L6 having negative refractive power, a seventh lens unit L7 having negative refractive power, and an eighth lens unit L8 having negative refractive power. The second lens unit L2 corresponds to the first focus lens unit LA, and moves toward the image side in focusing from an infinite-distance object to a close-distance object. The fourth lens unit L4 corresponds to the second focus lens unit LB, and moves toward the object side in focusing from an infinite-distance object to a close-distance object. The fifth to eighth lens units L5 to L8 have negative refractive power as a whole, and correspond to the partial optical system LC. In addition, the fifth lens unit L5 moves toward the object side in focusing from an infinite-distance object to a close-distance object, and the seventh lens unit L7 moves toward the image side in focusing from an infinite-distance object to a close-distance object. The lateral magnification βm of the optical system according to the fourth exemplary embodiment is −2.8.

The optical system according to the fifth exemplary embodiment includes, in order from the object side to the image side, the first lens unit L1 having positive refractive power, the second lens unit L2 having negative refractive power, the third lens unit L3 including the aperture stop SP and having positive refractive power, the fourth lens unit L4 having negative refractive power, and the fifth lens unit L5 having negative refractive power. The second lens unit L2 corresponds to the first focus lens unit LA, and moves toward the image side in focusing from an infinite-distance object to a close-distance object. The fourth lens unit L4 corresponds to the second focus lens unit LB, and moves toward the image side in focusing from an infinite-distance object to a close-distance object. The fifth lens unit L5 corresponds to the partial optical system LC. The lateral magnification βm of the optical system according to the fifth exemplary embodiment is −1.5.

The optical system according to the sixth exemplary embodiment includes, in order from the object side to the image side, the first lens unit L1 having positive refractive power, the second lens unit L2 having negative refractive power, the third lens unit L3 including the aperture stop SP and having positive refractive power, the fourth lens unit L4 having negative refractive power, and the fifth lens unit L5 having negative refractive power. The second lens unit L2 corresponds to the first focus lens unit LA, and moves toward the image side in focusing from an infinite-distance object to a close-distance object. The fourth lens unit L4 corresponds to the second focus lens unit LB, and moves toward the image side in focusing from an infinite-distance object to a close-distance object. The fifth lens unit L5 corresponds to the partial optical system LC. In addition, the fifth lens unit L5 moves toward the image side in focusing from an infinite-distance object to a close-distance object. The lateral magnification βm of the optical system according to the sixth exemplary embodiment is −2.0.

The optical system according to the seventh exemplary embodiment includes, in order from the object side to the image side, the first lens unit L1 having negative refractive power, the second lens unit L2 having positive refractive power, the third lens unit L3 including the aperture stop SP and having negative refractive power, the fourth lens unit L4 having positive refractive power, and the fifth lens unit L5 having negative refractive power. The second lens unit L2 corresponds to the first focus lens unit LA, and moves toward the object side in focusing from an infinite-distance object to a close-distance object. The fourth lens unit L4 corresponds to the second focus lens unit LB, and moves toward the object side in focusing from an infinite-distance object to a close-distance object. The fifth lens unit L5 corresponds to the partial optical system LC. The lateral magnification βm of the optical system according to the seventh exemplary embodiment is −1.3.

The optical system according to the eighth exemplary embodiment includes, in order from the object side to the image side, the first lens unit L1 having positive refractive power, the second lens unit L2 having positive refractive power, the third lens unit L3 including the aperture stop SP and having negative refractive power, the fourth lens unit L4 having negative refractive power, and the fifth lens unit L5 having negative refractive power. The second lens unit L2 corresponds to the first focus lens unit LA, and moves toward the object side in focusing from an infinite-distance object to a close-distance object. The fourth lens unit L4 corresponds to the second focus lens unit LB, and moves toward the image side in focusing from an infinite-distance object to a close-distance object. The fifth lens unit L5 corresponds to the partial optical system LC. The lateral magnification βm of the optical system according to the eighth exemplary embodiment is −1.5.

Numerical Examples 1 to 8 respectively corresponding to the first to eighth exemplary embodiments will be described below.

In surface data of each numerical example, "r" denotes a curvature radius of each optical surface, and "d" (mm) denotes an on-axis interval (distance on an optical axis) between an m-th surface and an (m+1)-th surface. Here, "m" denotes an ordinal number of a surface counted from the light incident side. In addition, "nd" denotes refractive index with respect to d-line of each optical component, and "vd" denotes Abbe number of each optical component.

In addition, in each numerical example, all values of "d", focal length (mm), F-number, and half field angle (°) are values obtained when the optical system according to each of the exemplary embodiments is in-focus state on an infinite-distance object. A back focus BF is a distance from a final lens surface to the image plane. The total lens length is a value obtained by adding a back focus to a distance from a first lens surface to a final lens surface.

In addition, in each numerical example, an aspherical-shaped lens surface is indicated by asterisk (*) added after a surface number. In addition, "e±P" in aspherical surface data means "×10$^{\pm P}$". An aspherical surface shape of an optical surface is represented by the following Expression A:

$$x=(h^2/R)/[1+\{1-(1+k)(h/R)^2\}^{1/2}]+A4\times h^4+A6\times h^6+A8\times h^8 \quad A,$$

where x is an amount of displacement from a surface vertex in an optical axis direction, h is a height from an optical axis in a direction vertical to the optical axis direction, R is a paraxial curvature radius, K is a conic constant, and A4, A6, and A8 are aspherical surface coefficients.

[Numerical Example 1]

| Unit: mm | | | | |
|---|---|---|---|---|
| Surface data | | | | |
| Surface number | r | d | nd | vd |
| 1 | 115.041 | 4.96 | 2.00069 | 25.5 |
| 2 | −298.226 | 1.20 | 1.53172 | 48.8 |
| 3 | 40.529 | 3.20 | | |
| 4 | 76.747 | 6.59 | 1.59522 | 67.7 |
| 5 | −118.732 | 0.15 | | |
| 6 | 130.015 | 7.45 | 1.60311 | 60.6 |
| 7 | −46.212 | 1.20 | 2.00069 | 25.5 |
| 8 | −374.729 | 0.20 | | |
| 9 | 39.827 | 6.48 | 1.49700 | 81.5 |
| 10 | −98.026 | (variable) | | |
| 11 | −142.559 | 1.20 | 1.83481 | 42.7 |
| 12 | 33.718 | 3.80 | | |
| 13 | −73.427 | 1.20 | 1.74320 | 49.3 |
| 14 | 33.507 | 4.63 | 1.80810 | 22.8 |
| 15 | ∞ | (variable) | | |
| 16 | ∞ | 0.20 | | |
| 17 (stop) | ∞ | 1.11 | | |
| 18 | 328.213 | 3.59 | 1.61997 | 63.9 |
| 19 | −59.848 | (variable) | | |
| 20 | 69.543 | 4.29 | 1.59522 | 67.7 |
| 21 | −76.731 | 0.20 | | |
| 22 | 61.230 | 5.38 | 1.60300 | 65.4 |
| 23 | −38.999 | 2.00 | 1.76182 | 26.5 |
| 24 | −310.133 | (variable) | | |
| 25 | 633.353 | 1.20 | 1.80100 | 35.0 |
| 26 | 27.848 | 2.84 | | |
| 27 | 35.158 | 1.38 | 1.48749 | 70.2 |
| 28 | 40.315 | 2.85 | 1.48749 | 70.2 |
| 29 | 165.151 | 6.60 | | |
| 30 | −103.219 | 4.57 | 1.80810 | 22.8 |
| 31 | −24.960 | 1.20 | 1.48749 | 70.2 |
| 32 | 44.976 | 8.95 | | |
| 33 | −21.059 | 1.20 | 1.61800 | 63.3 |
| 34 | −56.682 | 0.20 | | |
| 35 | 58.438 | 4.39 | 1.60311 | 60.6 |
| 36 | −447.212 | 23.38 | | |
| 37 | ∞ | 1.50 | 1.51633 | 64.1 |
| 38 | ∞ | 0.37 | | |
| Image plane | ∞ | | | |

| Various kinds of data | |
|---|---|
| Focal length | 99.70 |
| F-number | 2.92 |
| Half field angle (°) | 12.24 |
| Image height | 21.64 |
| Total lens length | 164.46 |
| BF | 24.74 |

| Magnification | ∞ | −1.0 | −1.2 | −2.0 |
|---|---|---|---|---|
| d10 | 1.00 | 11.11 | 13.35 | 21.24 |
| d15 | 21.24 | 11.13 | 8.90 | 1.00 |
| d19 | 22.07 | 10.70 | 8.33 | 1.00 |
| d24 | 1.00 | 12.36 | 14.74 | 22.07 |

| Lens unit data | | |
|---|---|---|
| Unit | Start surface | Focal length |
| 1 | 1 | 41.49 |
| 2 | 11 | −25.11 |
| 3 | 16 | 81.94 |
| 4 | 20 | 41.27 |
| 5 | 25 | −31.63 |

[Numerical Example 2]

| Unit: mm | | | | |
|---|---|---|---|---|
| Surface data | | | | |
| Surface number | r | d | nd | vd |
| 1 | 85.290 | 5.22 | 1.91650 | 31.6 |
| 2 | −257.004 | 2.93 | 1.57135 | 53.0 |
| 3 | 38.839 | 1.99 | | |
| 4 | 57.219 | 6.93 | 1.43875 | 94.9 |
| 5 | −99.117 | 0.10 | | |
| 6 | 90.064 | 6.53 | 1.53775 | 74.7 |
| 7 | −49.382 | 0.97 | 2.00100 | 29.1 |
| 8 | −279.109 | 0.10 | | |
| 9 | 36.255 | 6.06 | 1.43875 | 94.9 |
| 10 | −103.644 | (variable) | | |
| 11 | −201.431 | 0.95 | 1.81600 | 46.6 |
| 12 | 30.483 | 4.64 | | |
| 13 | −93.270 | 0.97 | 1.59282 | 68.6 |
| 14 | 32.887 | 4.07 | 1.78472 | 25.7 |

-continued

| Unit: mm | | | | |
|---|---|---|---|---|
| 15 | 227.240 | (variable) | | |
| 16 | ∞ | 0.47 | | |
| 17 (stop) | ∞ | (variable) | | |
| 18 | 686.622 | 4.34 | 1.53775 | 74.7 |
| 19 | −53.732 | (variable) | | |
| 20 | 62.211 | 4.29 | 1.43875 | 94.9 |
| 21 | −76.198 | 0.07 | | |
| 22 | 93.757 | 4.03 | 1.53775 | 74.7 |
| 23 | −45.927 | 1.82 | 1.75520 | 27.5 |
| 24 | −153.709 | (variable) | | |
| 25 | 311.541 | 4.40 | 1.80610 | 33.3 |
| 26 | 32.686 | 1.36 | | |
| 27 | 35.676 | 2.98 | 1.64000 | 60.1 |
| 28 | 43.556 | 5.00 | 1.95906 | 17.5 |
| 29 | 50.034 | 4.71 | | |
| 30 | −1008.598 | 5.03 | 1.64769 | 33.8 |
| 31 | −22.613 | 2.00 | 1.51633 | 64.1 |
| 32 | 57.920 | 9.80 | | |
| 33 | −20.232 | 1.68 | 1.53775 | 74.7 |
| 34 | −105.272 | 0.20 | | |
| 35 | 68.348 | 5.72 | 1.75500 | 52.3 |
| 36 | −260.009 | 22.00 | | |
| 37 | ∞ | 1.50 | 1.51633 | 64.1 |
| 38 | ∞ | 0.36 | | |
| Image plane | ∞ | | | |

| Various kinds of data | |
|---|---|
| Focal length | 111.55 |
| F-number | 2.92 |
| Half field angle (°) | 10.98 |
| Image height | 21.64 |
| Total lens length | 170.07 |
| BF | 23.35 |

| Magnification | ∞ | −1.0 | −1.2 | −2.0 |
|---|---|---|---|---|
| d10 | 0.10 | 9.20 | 11.25 | 17.74 |
| d15 | 18.64 | 9.53 | 7.49 | 1.00 |
| d17 | 10.24 | 6.88 | 5.71 | 1.00 |
| d19 | 17.27 | 5.91 | 4.44 | 0.10 |
| d24 | 1.12 | 15.83 | 18.48 | 27.53 |

| Lens unit data | | |
|---|---|---|
| Unit | Start surface | Focal length |
| 1 | 1 | 42.28 |
| 2 | 11 | −28.07 |
| 3 | 18 | 92.86 |
| 4 | 20 | 54.36 |
| 5 | 25 | −35.12 |

[Numerical Example 3]

| Unit: mm | | | | |
|---|---|---|---|---|
| Surface data | | | | |
| Surface number | r | d | nd | νd |
| 1 | 114.017 | 4.02 | 1.83481 | 42.7 |
| 2 | −129.357 | 1.22 | | |
| 3 | 41.490 | 4.73 | 1.43875 | 94.9 |
| 4 | −152.883 | 0.63 | | |
| 5 | −91.942 | 0.70 | 1.96300 | 24.1 |
| 6 | 120.327 | 0.19 | | |
| 7 | 33.297 | 4.00 | 1.43875 | 94.9 |
| 8 | −220.670 | (variable) | | |
| 9 | −1358.413 | 0.98 | 1.75500 | 52.3 |
| 10 | 23.285 | 3.61 | | |
| 11 | −227.223 | 0.99 | 1.63930 | 44.9 |
| 12 | 23.180 | 3.58 | 1.85896 | 22.7 |
| 13 | 106.679 | (variable) | | |
| 14 | ∞ | 0.48 | | |
| 15 (stop) | ∞ | (variable) | | |
| 16 | 75.913 | 5.01 | 1.49700 | 81.5 |
| 17 | −49.042 | 0.04 | | |
| 18 | 44.446 | 6.98 | 1.49700 | 81.5 |
| 19 | −38.982 | 1.60 | 1.62004 | 36.3 |
| 20 | −169.950 | (variable) | | |
| 21 | 111.697 | 2.72 | 1.75500 | 52.3 |
| 22 | 23.318 | (variable) | | |
| 23 | 32.386 | 6.14 | 2.00100 | 29.1 |
| 24 | 125.586 | 1.30 | 1.80810 | 22.8 |
| 25 | 34.640 | 7.32 | | |
| 26 | −25.350 | 1.20 | 1.59282 | 68.6 |
| 27 | −266.543 | 0.51 | | |
| 28 | 51.360 | 8.18 | 1.49700 | 81.5 |
| 29 | −75.306 | 25.12 | | |
| 30 | ∞ | 1.50 | 1.51633 | 64.1 |
| 31 | ∞ | 0.37 | | |
| Image plane | ∞ | | | |

| Various kinds of data | |
|---|---|
| Focal length | 87.55 |
| F-number | 2.92 |
| Half field angle (°) | 13.88 |
| Image height | 21.64 |
| Total lens length | 142.88 |
| BF | 26.49 |

| Magnification | ∞ | −1.0 | −1.2 | −1.5 |
|---|---|---|---|---|
| d8 | 0.26 | 10.40 | 11.57 | 12.92 |
| d13 | 13.83 | 3.70 | 2.52 | 1.18 |
| d15 | 25.22 | 8.68 | 5.57 | 0.99 |
| d20 | 7.91 | 20.96 | 24.57 | 29.95 |
| d22 | 3.03 | 6.51 | 6.02 | 5.22 |

| Lens unit data | | |
|---|---|---|
| Unit | Start surface | Focal length |
| 1 | 1 | 42.79 |
| 2 | 9 | −28.65 |
| 3 | 16 | 36.08 |
| 4 | 21 | −39.56 |
| 5 | 23 | 195.21 |

[Numerical Example 4]

| Unit: mm | | | | |
|---|---|---|---|---|
| Surface data | | | | |
| Surface number | r | d | nd | νd |
| 1 | 74.790 | 5.74 | 1.91082 | 35.3 |
| 2 | −307.571 | 1.62 | 1.53775 | 74.7 |
| 3 | 38.330 | 1.90 | | |
| 4 | 53.851 | 7.31 | 1.43875 | 94.9 |
| 5 | −93.659 | 0.07 | | |
| 6 | 59.550 | 7.10 | 1.43875 | 94.9 |
| 7 | −44.235 | 0.95 | 2.00069 | 25.5 |
| 8 | −164.661 | 0.10 | | |
| 9 | 43.409 | 4.59 | 1.49700 | 81.5 |
| 10 | −86.408 | (variable) | | |
| 11 | −122.734 | 0.97 | 1.85150 | 40.8 |
| 12 | 26.875 | 3.96 | | |
| 13 | −59.975 | 0.92 | 1.69680 | 55.5 |
| 14 | 28.933 | 3.57 | 1.85896 | 22.7 |
| 15 | 229.535 | (variable) | | |
| 16 | ∞ | 0.37 | | |
| 17 (stop) | ∞ | 0.88 | | |
| 18 | 5369.938 | 3.54 | 1.59282 | 68.6 |
| 19 | −56.682 | (variable) | | |
| 20 | 87.558 | 4.96 | 1.43875 | 94.9 |
| 21 | −53.346 | −0.05 | | |
| 22 | 40.433 | 6.61 | 1.43875 | 94.9 |
| 23 | −47.075 | 1.19 | 1.73800 | 32.3 |

-continued

Unit: mm

| | | | | |
|---|---|---|---|---|
| 24 | −111.190 | (variable) | | |
| 25 | 28.369 | 1.81 | 1.75700 | 47.8 |
| 26 | 20.367 | (variable) | | |
| 27 | 33.781 | 4.65 | 1.67270 | 32.1 |
| 28 | −887.252 | 2.88 | 2.00069 | 25.5 |
| 29 | 40.642 | (variable) | | |
| 30 | −48.362 | 6.01 | 2.00069 | 25.5 |
| 31 | −34.690 | 2.50 | 1.51823 | 58.9 |
| 32 | −172.798 | (variable) | | |
| 33 | −38.708 | 1.33 | 1.72916 | 54.7 |
| 34 | 73.913 | 0.18 | | |
| 35 | 46.440 | 5.51 | 1.85478 | 24.8 |
| 36 | 320.700 | 25.00 | | |
| 37 | ∞ | 1.50 | 1.51633 | 64.1 |
| 38 | ∞ | 0.38 | | |
| Image plane | ∞ | | | |

Various kinds of data

| | |
|---|---|
| Focal length | 97.07 |
| F-number | 2.92 |
| Half field angle (°) | 12.56 |
| Image height | 21.64 |
| Total lens length | 177.88 |
| BF | 26.37 |

| Magnification | ∞ | −1.0 | −1.2 | −2.8 |
|---|---|---|---|---|
| d10 | 0.12 | 8.75 | 10.64 | 19.95 |
| d15 | 20.83 | 12.19 | 10.31 | 1.00 |
| d19 | 33.88 | 19.61 | 16.97 | 1.00 |
| d24 | 0.22 | 9.03 | 10.81 | 24.21 |
| d26 | 2.87 | 8.33 | 9.19 | 11.77 |
| d29 | 3.91 | 8.34 | 8.79 | 8.30 |
| d32 | 8.50 | 4.07 | 3.62 | 4.11 |

Lens unit data

| Unit | Start surface | Focal length |
|---|---|---|
| 1 | 1 | 37.25 |
| 2 | 11 | −19.88 |
| 3 | 16 | 94.64 |
| 4 | 20 | 41.79 |
| 5 | 25 | −105.69 |
| 6 | 27 | −333.13 |
| 7 | 30 | −369.69 |
| 8 | 33 | −77.66 |

[Numerical Example 5]

Unit: mm

Surface data

| Surface number | r | d | nd | vd |
|---|---|---|---|---|
| 1 | 237.159 | 3.97 | 1.59522 | 67.7 |
| 2 | −138.265 | 0.14 | | |
| 3 | 70.172 | 4.92 | 1.59522 | 67.7 |
| 4 | −213.463 | 1.27 | | |
| 5 | −136.032 | 1.19 | 1.80810 | 22.8 |
| 6 | 184.319 | 0.19 | | |
| 7 | 31.946 | 4.06 | 1.80810 | 22.8 |
| 8 | 26.285 | 1.23 | | |
| 9 | 33.957 | 4.15 | 1.59522 | 67.7 |
| 10 | 2307.010 | (variable) | | |
| 11 | −309.389 | 0.99 | 1.88300 | 40.8 |
| 12 | 31.039 | 5.19 | | |
| 13 | −63.445 | 0.84 | 1.76385 | 48.5 |
| 14 | 42.029 | 3.79 | 1.80810 | 22.8 |
| 15 | −93.464 | (variable) | | |
| 16 (stop) | ∞ | 3.00 | | |
| 17 | 925.313 | 5.66 | 1.48749 | 70.2 |
| 18 | −36.874 | 3.01 | | |
| 19 | 42.040 | 5.55 | 1.65160 | 58.5 |

-continued

Unit: mm

| | | | | |
|---|---|---|---|---|
| 20 | −70.827 | 1.10 | 1.96300 | 24.1 |
| 21 | −144.265 | (variable) | | |
| 22 | −42.225 | 1.13 | 1.73400 | 51.5 |
| 23 | 61.187 | 7.78 | | |
| 24 | 1917.613 | 4.80 | 1.76385 | 48.5 |
| 25 | −36.897 | (variable) | | |
| 26 | −50.032 | 4.00 | 2.00069 | 25.5 |
| 27 | 124.454 | 0.02 | | |
| 28 | 110.649 | 4.55 | 1.48749 | 70.2 |
| 29 | −254.409 | 21.52 | | |
| 30 | ∞ | 1.50 | 1.51633 | 64.1 |
| 31 | ∞ | 0.50 | | |
| Image plane | ∞ | | | |

Various kinds of data

| | |
|---|---|
| Focal length | 87.51 |
| F-number | 2.92 |
| Half field angle (°) | 13.89 |
| Image height | 21.64 |
| Total lens length | 156.89 |
| BF | 23.01 |

| Magnification | ∞ | −1.0 | −1.2 | −1.5 |
|---|---|---|---|---|
| d10 | 0.94 | 21.82 | 25.73 | 30.69 |
| d15 | 31.40 | 10.51 | 6.60 | 1.64 |
| d21 | 1.74 | 18.16 | 21.53 | 28.05 |
| d25 | 27.29 | 10.87 | 7.49 | 0.97 |

Lens unit data

| Unit | Start surface | Focal length |
|---|---|---|
| 1 | 1 | 50.01 |
| 2 | 11 | −30.25 |
| 3 | 16 | 32.88 |
| 4 | 22 | −589.89 |
| 5 | 26 | −46.20 |

[Numerical Example 6]

Unit: mm

Surface data

| Surface number | r | d | nd | vd |
|---|---|---|---|---|
| 1 | 500.000 | 3.41 | 1.59282 | 68.6 |
| 2 | −157.319 | 0.10 | | |
| 3 | 50.189 | 5.30 | 1.72916 | 54.7 |
| 4* | −986.012 | 1.29 | | |
| 5 | −219.904 | 1.06 | 1.92286 | 20.9 |
| 6 | 228.546 | 0.03 | | |
| 7 | 117.713 | 1.36 | 2.00069 | 25.5 |
| 8 | 49.166 | −0.07 | | |
| 9 | 41.015 | 6.89 | 1.59522 | 67.7 |
| 10 | −83.063 | (variable) | | |
| 11 | 1295.851 | 0.94 | 1.81600 | 46.6 |
| 12 | 29.227 | 5.23 | | |
| 13 | −55.392 | 0.63 | 1.69350 | 50.8 |
| 14 | 29.582 | 4.14 | 1.92286 | 20.9 |
| 15 | 539.950 | (variable) | | |
| 16 (stop) | ∞ | 1.79 | | |
| 17 | 106.286 | 5.53 | 1.59522 | 67.7 |
| 18* | −43.684 | 3.02 | | |
| 19 | 62.655 | 6.12 | 1.59522 | 67.7 |
| 20 | −30.037 | 0.94 | 2.00069 | 25.5 |
| 21 | −54.423 | (variable) | | |
| 22 | −42.852 | 1.08 | 1.59282 | 68.6 |
| 23 | 40.106 | 20.65 | | |
| 24 | −181.857 | 4.82 | 1.69930 | 51.1 |
| 25 | −34.638 | (variable) | | |
| 26 | −66.535 | 1.19 | 2.00069 | 25.5 |
| 27 | 94.110 | 1.29 | | |
| 28 | 94.110 | 3.22 | 1.48749 | 70.2 |

-continued

Unit: mm

| | | | | |
|---|---|---|---|---|
| 29 | −300.000 | 12.27 | | |
| 30 | ∞ | 1.50 | 1.51633 | 64.1 |
| 31 | ∞ | 0.44 | | |
| Image plane | ∞ | | | |

Aspherical surface data

Fourth surface

K = 0.00000e+000 A4 = 2.58513e−006 A6 = −4.47243e−010
A8 = 1.68012e−012
Eighteenth surface K = 0.00000e+000 A4 = 9.95902e−007 A6 = −3.39682e−011
A8 = −1.43118e−012

Various kinds of data

| | |
|---|---|
| Focal length | 87.58 |
| F-number | 2.92 |
| Half field angle (°) | 13.88 |
| Image height | 21.64 |
| Total lens length | 161.43 |
| BF | 13.70 |

| Magnification | ∞ | −1.0 | −1.2 | −2.0 |
|---|---|---|---|---|
| d10 | 0.61 | 15.16 | 18.12 | 27.53 |
| d15 | 28.36 | 13.81 | 10.84 | 1.43 |
| d21 | 0.97 | 17.91 | 21.81 | 38.44 |
| d25 | 37.8 | 20.91 | 17.01 | 0.98 |

Lens unit data

| Unit | Start surface | Focal length |
|---|---|---|
| 1 | 1 | 47.55 |
| 2 | 11 | −28.82 |
| 3 | 16 | 31.66 |
| 4 | 22 | −1815.99 |
| 5 | 26 | −53.75 |

[Numerical Example 7]

Unit: mm

Surface data

| Surface number | r | d | nd | vd |
|---|---|---|---|---|
| 1 | 50.145 | 5.00 | 1.43875 | 94.9 |
| 2 | −681.596 | 2.00 | 1.65412 | 39.7 |
| 3 | 60.273 | (variable) | | |
| 4 | 41.198 | 5.90 | 1.88300 | 40.8 |
| 5 | −591.996 | 0.11 | | |
| 6* | 48.387 | 1.11 | 1.96300 | 24.1 |
| 7 | 24.644 | 7.20 | 1.59522 | 67.7 |
| 8 | −440.997 | (variable) | | |
| 9 | −262.028 | 1.11 | 1.65160 | 58.5 |
| 10 | 16.355 | 4.56 | 1.80810 | 22.8 |
| 11 | 27.780 | 3.29 | | |
| 12 | ∞ | 0.36 | | |
| 13 (stop) | ∞ | 0.79 | | |
| 14 | −406.850 | 0.80 | 1.61800 | 63.3 |
| 15 | 46.406 | (variable) | | |
| 16* | 105.635 | 1.38 | 1.85896 | 22.7 |
| 17 | 24.111 | 8.22 | 1.89190 | 37.1 |
| 18 | −39.767 | (variable) | | |
| 19 | 103.411 | 1.18 | 1.96300 | 24.1 |
| 20 | 32.474 | 14.43 | | |
| 21 | −25.796 | 4.50 | 1.91650 | 31.6 |
| 22 | −78.407 | 0.19 | | |
| 23 | −323.723 | 8.89 | 1.72825 | 28.5 |
| 24 | −29.595 | 29.07 | | |

-continued

Unit: mm

| | | | | |
|---|---|---|---|---|
| 25 | ∞ | 1.50 | 1.51633 | 64.1 |
| 26 | ∞ | 0.30 | | |
| Image plane | ∞ | | | |

Aspherical surface data

Sixth surface

K = 0.00000e+000 A4 = −2.44854e−006 A6 = −1.45860e−009
A8 = −3.67049e−012
Sixteenth surface K = 0.00000e+000 A4 = −8.81694e−006 A6 = −2.05356e−009
A8 = −7.47750e−012

Various kinds of data

| | |
|---|---|
| Focal length | 100.00 |
| F-number | 2.92 |
| Half field angle (°) | 12.21 |
| Image height | 21.64 |
| Total lens length | 133.45 |
| BF | 30.36 |

| Magnification | ∞ | −1.0 | −1.2 | −1.3 |
|---|---|---|---|---|
| d3 | 14.84 | 2.70 | 0.99 | 0.18 |
| d8 | 0.82 | 12.96 | 14.66 | 15.48 |
| d15 | 14.96 | 9.21 | 6.56 | 5.27 |
| d18 | 1.46 | 7.21 | 9.87 | 11.15 |

Lens unit data

| Group | Start surface | Focal length |
|---|---|---|
| 1 | 1 | −508.03 |
| 2 | 4 | 34.65 |
| 3 | 9 | −26.54 |
| 4 | 16 | 32.41 |
| 5 | 19 | −100.11 |

[Numerical Example 8]

Unit: mm

Surface data

| Surface number | r | d | nd | vd |
|---|---|---|---|---|
| 1 | 309.543 | 6.87 | 1.60342 | 38.0 |
| 2 | −56.853 | 1.50 | 1.91082 | 35.3 |
| 3 | −337.400 | 0.20 | | |
| 4 | 706.618 | 4.04 | 1.59282 | 68.6 |
| 5 | −103.752 | 0.19 | | |
| 6 | 36.947 | 3.80 | 1.78472 | 25.7 |
| 7 | 61.026 | 4.20 | | |
| 8 | 45.266 | 1.29 | 2.00069 | 25.5 |
| 9 | 28.449 | (variable) | | |
| 10 | 31.551 | 1.19 | 2.00069 | 25.5 |
| 11 | 23.542 | 5.24 | 1.59522 | 67.7 |
| 12 | 122.935 | 0.29 | | |
| 13 | 39.982 | 3.78 | 1.59522 | 67.7 |
| 14 | −576.650 | (variable) | | |
| 15 (stop) | ∞ | 2.03 | | |
| 16 | −46.435 | 1.20 | 1.80440 | 39.6 |
| 17 | 30.267 | 3.88 | | |
| 18 | −2325.853 | 3.71 | 1.74077 | 27.8 |
| 19 | −32.818 | 2.99 | 1.48749 | 70.2 |
| 20 | −26.802 | (variable) | | |
| 21 | −80.286 | 4.50 | 1.91082 | 35.3 |
| 22 | −17.723 | 1.07 | 1.60342 | 38.0 |
| 23 | 76.812 | (variable) | | |
| 24 | −20.525 | 1.19 | 1.91082 | 35.3 |
| 25 | −75.757 | 1.44 | 1.85896 | 22.7 |
| 26 | −66.498 | 1.18 | | |
| 27* | 37.095 | 4.00 | 1.80810 | 22.8 |

-continued

Unit: mm

| 28 | 55.754 | 4.51 | 1.51633 | 64.1 |
| 29 | −314.637 | 22.22 | | |
| 30 | ∞ | 1.50 | 1.51633 | 64.1 |
| 31 | ∞ | 0.47 | | |
| Image plane | ∞ | | | |

Aspherical surface data

Twenty-seventh surface

K = 0.00000e+000 A4 = −7.61233e−006 A6 = 7.25390e−009
A8 = −5.55141e−012

Various kinds of data

| Focal length | 118.66 |
| F-number | 2.92 |
| Half field angle (°) | 10.33 |
| Image height | 21.64 |
| Total lens length | 137.11 |
| BF | 23.67 |

| Magnification | ∞ | −1.0 | −1.2 | −1.5 |
| d9 | 24.22 | 8.79 | 5.95 | 1.83 |
| d14 | 0.47 | 15.90 | 18.73 | 22.86 |
| d20 | 7.28 | 12.66 | 15.00 | 19.81 |
| d23 | 17.18 | 11.79 | 9.46 | 4.64 |

Lens unit data

| Group | Start surface | Focal length |
| --- | --- | --- |
| 1 | 1 | 237.94 |
| 2 | 10 | 39.94 |
| 3 | 15 | −98.01 |
| 4 | 21 | −637.80 |
| 5 | 24 | −100.04 |

Various values in each numerical example are listed in Table 1 provided below.

TABLE 1

| | | N.E. 1 | N.E. 2 | N.E. 3 | N.E. 4 | N.E. 5 | N.E. 6 | N.E. 7 | N.E. 8 |
| --- | --- | --- | --- | --- | --- | --- | --- | --- | --- |
| Conditional Expression (1) | fLCX/fX | −0.70 | −0.78 | 0.68 | −0.70 | −1.01 | −1.24 | −1.47 | −2.19 |
| Conditional Expression (2) | fLCY/f | −0.32 | −0.31 | −0.37 | −0.32 | −0.53 | −0.61 | −1.00 | −0.84 |
| Conditional Expression (3) | |fLA/f| | 0.25 | 0.25 | 0.33 | 0.20 | 0.35 | 0.33 | 0.35 | 0.34 |
| Conditional Expression (4) | sk/fLCY | −0.78 | −0.64 | −0.82 | −0.84 | −0.50 | −0.25 | −0.30 | −0.24 |
| Conditional Expression (5) | |ESA| | 5.48 | 6.83 | 4.09 | 6.11 | 2.85 | 3.12 | 6.29 | 7.04 |
| Conditional Expression (6) | |ESB| | 5.57 | 4.24 | 3.80 | 4.98 | 2.46 | 3.59 | 4.24 | 3.98 |
| Conditional Expression (7) | (|MA| + |MB|)/f | 0.22 | 0.21 | 0.30 | 0.24 | 0.43 | 0.36 | 0.18 | 0.18 |
| Conditional Expression (8) | Di/f | 1.01 | 0.97 | 1.19 | 1.22 | 1.06 | 1.17 | 0.88 | 0.68 |
| Conditional Expression (9) | fL1/f | 0.42 | 0.38 | 0.49 | 0.38 | 0.57 | 0.54 | — | 2.01 |
| Conditional Expression (10) | fI/f | 0.86 | 0.65 | 0.72 | 0.65 | 1.82 | 1.68 | 0.44 | 0.78 |
| Conditional Expression (11) | βm | −2.00 | −2.00 | −1.50 | −2.80 | −1.50 | −2.00 | −1.30 | −1.50 |

N.E. = Numerical Example

Imaging Apparatus

Figure 17:
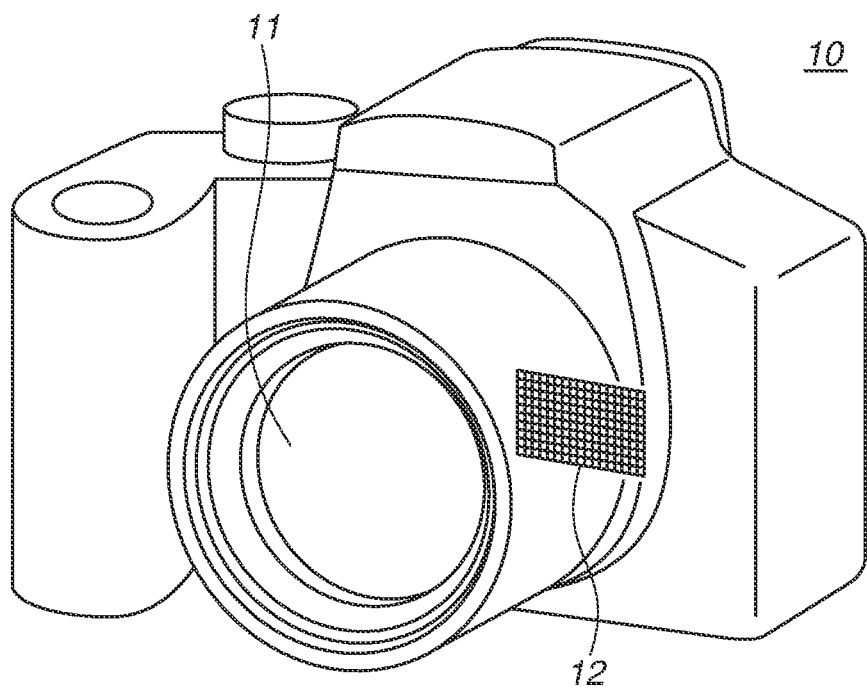
FIG. 17 is a schematic diagram of an imaging apparatus.

Next, a digital still camera (imaging apparatus) that uses an optical system according to one of the exemplary embodiments of the present invention as an imaging optical system will be described with reference to FIG. 17. In FIG. 17, the digital still camera includes a camera main body 10, and an imaging optical system 11 including any of the optical systems described in the first to eighth exemplary embodiments. The digital still camera further includes a solid-state image sensor (photoelectric conversion element) 12 such as a CCD sensor or a CMOS sensor that is built in the camera main body 10, and that receives and photoelectrically converts an optical image formed by the imaging optical system 11. The camera main body 10 may be a so-called single-lens reflex camera including a quick return mirror, or may be a so-called mirrorless camera not including an instant return mirror.

In this manner, by using the optical system according to an exemplary embodiment of the present invention for an imaging apparatus such as a digital still camera, it is possible to perform image capturing at an imaging magnification of a same magnification or more, and it is possible to obtain a compact imaging apparatus having high optical performance.

Hereinbefore, the exemplary embodiments of the present invention have been described, but the present invention is not limited to these exemplary embodiments, and various combinations, modifications, and changes can be made within the scope of the present invention.

According to an exemplary embodiment of the present invention, it is possible to realize a compact optical system that has high optical performance and can perform image capturing at an imaging magnification of a same magnification or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical system in which an interval between adjacent lens units is configured to change during focusing from an infinite-distance object to a close-distance object, and in which in a first in-focus state β=−1.2 is satisfied, where β is a lateral magnification of the optical system, the optical system comprising:
  two focus lens units configured to move during focusing from an infinite-distance object to a close-distance object; and
  an aperture stop,
  wherein the two focus lens units include a first focus lens unit (LA) disposed on an object side and a second focus lens unit (LB) disposed on an image side,
  wherein the second focus lens unit (LB) has negative refractive power as a whole, and includes a biconcave lens and a positive lens with a convex surface on an image side, the positive lens being disposed on an image side of the biconcave lens, and
  wherein the following inequality is satisfied:

$$0.50 < Di/f < 1.50,$$

where Di is a distance from the aperture stop to an image plane in an in-focus state on an infinite-distance object and f is a focal length of the optical system in an in-focus state on an infinite-distance object.

2. The optical system according to claim 1, wherein the following inequality is satisfied:

$$0.10 < fLA/f < 0.50,$$

where fLA is a focal length of the first focus lens unit (LA).

3. The optical system according to claim 1, wherein the following inequality is satisfied:

$$0.10 < |ESB| < 6.00,$$

where ESB is a focus sensitivity of the second focus lens unit (LB) in an in-focus state on an infinite-distance object.

4. The optical system according to claim 1, wherein the following inequality is satisfied:

$$0.05 < (|MA|+|MB|)/f < 0.60,$$

where MA is an amount of movement of the first focus lens unit (LA) moved from an in-focus state on an infinite-distance object to the second in-focus state, where β=−1.0, and MB is an amount of movement of the second focus lens unit (LB) moved from an in-focus state on an infinite-distance object to the second in-focus state.

5. The optical system according to claim 1, wherein a first lens unit (L1) disposed closest to the object side in the optical system has positive refractive power.

6. The optical system according to claim 5, wherein the following inequality is satisfied:

$$0.10 < fL1/f < 2.50,$$

where fL1 is a focal length of the first lens unit (L1).

7. The optical system according to claim 5, wherein the first focus lens unit (LA) has negative refractive power.

8. The optical system according to claim 1, wherein a lens disposed closest to an image side in the optical system has positive refractive power.

9. The optical system according to claim 8, wherein the following inequality is satisfied:

$$0.25 < fI/f < 2.20,$$

where fI is a focal length of the lens disposed closest to the image side in the optical system.

10. The optical system according to claim 1, wherein the following inequality is satisfied:

$$-5.0 < \beta m < -1.2,$$

where βm is a lateral magnification when imaging magnification magnitude is largest in the optical system.

11. The optical system according to claim 1,
  wherein the first focus lens unit LA is disposed on a light incident side of the aperture stop, and
  wherein the second focus lens unit LB is disposed on a light emission side of the aperture stop.

12. The optical system according to claim 1, wherein the first focus lens unit (LA) includes three or more lenses including a negative lens and a positive lens.

13. The optical system according to claim 1, wherein a first lens unit (L1) disposed closest to the object side in the optical system is fixed during focusing.

14. The optical system according to claim 1, wherein the following inequality is satisfied:

$$2.50 < |ESA| < 7.50,$$

where ESA is a focus sensitivity of the first focus lens unit (LA) in an in-focus state on an infinite-distance object.

15. The optical system according to claim 1, wherein a lens disposed closest to the object side and a lens disposed closest to the image side are biconvex lenses.

16. An imaging apparatus comprising:
  an optical system; and
  an image sensor configured to photoelectrically convert an optical image formed by the optical system,
  wherein, in the optical system, an interval between adjacent lens units changes in focusing from an infinite-distance object to a close-distance object, and a first in-focus state in which β=−1.2 is satisfied can be achieved, where β is a lateral magnification of an entire system,
  wherein the optical system includes two focus lens units configured to move in focusing from an infinite-distance object to a close-distance object, and an aperture stop,
  wherein the two focus lens units include a first focus lens unit (LA) disposed on an object side and a second focus lens unit (LB) disposed on an image side,
  wherein the second focus lens unit (LB) has negative refractive power as a whole and includes a biconcave lens and a positive lens with a concave surface on an image side, the positive lens being disposed on an image side of the biconcave lens, and
  wherein the following inequality is satisfied:

$$0.50 < Di/f < 1.50,$$

where Di is a distance from the aperture stop to an image plane in an in-focus state on an infinite-distance object and f is a focal length of the optical system in an in-focus state on an infinite-distance object.

17. An optical system in which an interval between adjacent lens units is configured to change during focusing from an infinite-distance object to a close-distance object, and in which in a first in-focus state β=−1.2 is satisfied, where β is a lateral magnification of the optical system, the optical system comprising:
  two focus lens units configured to move during focusing from an infinite-distance object to a close-distance object,
  wherein the two focus lens units includes a first focus lens unit (LA) disposed on an object side and a second focus lens unit (LB) disposed on an image side,
  wherein the second focus lens unit (LB) has negative refractive power as a whole, and includes a biconcave lens and a positive lens with a convex surface on an image side, the positive lens being disposed on an image side of the biconcave lens, wherein a lens disposed closest to an image side in the optical system has positive refractive power.

18. The optical system according to claim 17, wherein the following inequality is satisfied:

$$0.25 < fI/f < 2.20,$$

where fI is a focal length of the lens disposed closest to the image side in the optical system and f is a focal length of the optical system in an in-focus state on an infinite-distance object.

* * * * *